(12) United States Patent
Dutton

(10) Patent No.: US 9,092,873 B2
(45) Date of Patent: Jul. 28, 2015

(54) RASTERIZER PACKET GENERATOR FOR USE IN GRAPHICS PROCESSOR

(75) Inventor: Marcus Franklin Dutton, Canton, GA (US)

(73) Assignee: L-3 COMMUNICATIONS CORPORATION, New York, NY (US)

( * ) Notice: Subject to any disclaimer, the term of this patent is extended or adjusted under 35 U.S.C. 154(b) by 25 days.

(21) Appl. No.: 13/363,864

(22) Filed: Feb. 1, 2012

(65) Prior Publication Data
US 2012/0200582 A1 Aug. 9, 2012

Related U.S. Application Data

(60) Provisional application No. 61/439,142, filed on Feb. 3, 2011.

(51) Int. Cl.
*G06T 1/20* (2006.01)

(52) U.S. Cl.
CPC ............................... *G06T 1/20* (2013.01)

(58) Field of Classification Search
CPC .......... G06T 1/20; G06T 15/005; G06T 15/10
See application file for complete search history.

(56) References Cited

U.S. PATENT DOCUMENTS

| 2006/0132491 A1* | 6/2006 | Riach et al. ................. 345/505 |
| 2007/0061810 A1* | 3/2007 | Mehaffy et al. ............. 718/104 |
| 2008/0235316 A1* | 9/2008 | Du et al. ..................... 708/513 |
| 2009/0073177 A1* | 3/2009 | Jiao et al. .................... 345/501 |
| 2010/0026682 A1  | 2/2010 | Plowman et al. |
| 2010/0218146 A1* | 8/2010 | Platzker et al. ................. 716/4 |
| 2010/0302246 A1* | 12/2010 | Jiao et al. .................... 345/426 |
| 2011/0018884 A1* | 1/2011 | Ritts et al. ................... 345/522 |
| 2012/0081580 A1  | 4/2012 | Cote et al. |
| 2012/0200581 A1  | 8/2012 | Dutton |

FOREIGN PATENT DOCUMENTS

WO    2010141612    12/2010

OTHER PUBLICATIONS

"The Challenges of Graphics Processing in the Avionics Industry" by Marcus Dutton, et al; 9 pages; dated 2010.
The International Search Report and the Written Opinion; European Patent Office; 11 pages; dated May 2, 2012.
International Search Report and Written Opinion for PCT/US2012/023470 dated Apr. 18, 2012.

* cited by examiner

*Primary Examiner* — Hau Nguyen
(74) *Attorney, Agent, or Firm* — Gardner Groff Greenwald & Villanueva, PC

(57) ABSTRACT

A rasterizer in a graphic processor device implemented on a field programmable gate array circuitry (FPGA). The rasterizer comprises a preprocessor that creates data packets to generate at least one line, a main module that generates a stream of data fragments that become pixels, and a postprocessor that combines the data fragments and pipeline commands into one output to a fragment processor.

16 Claims, 14 Drawing Sheets

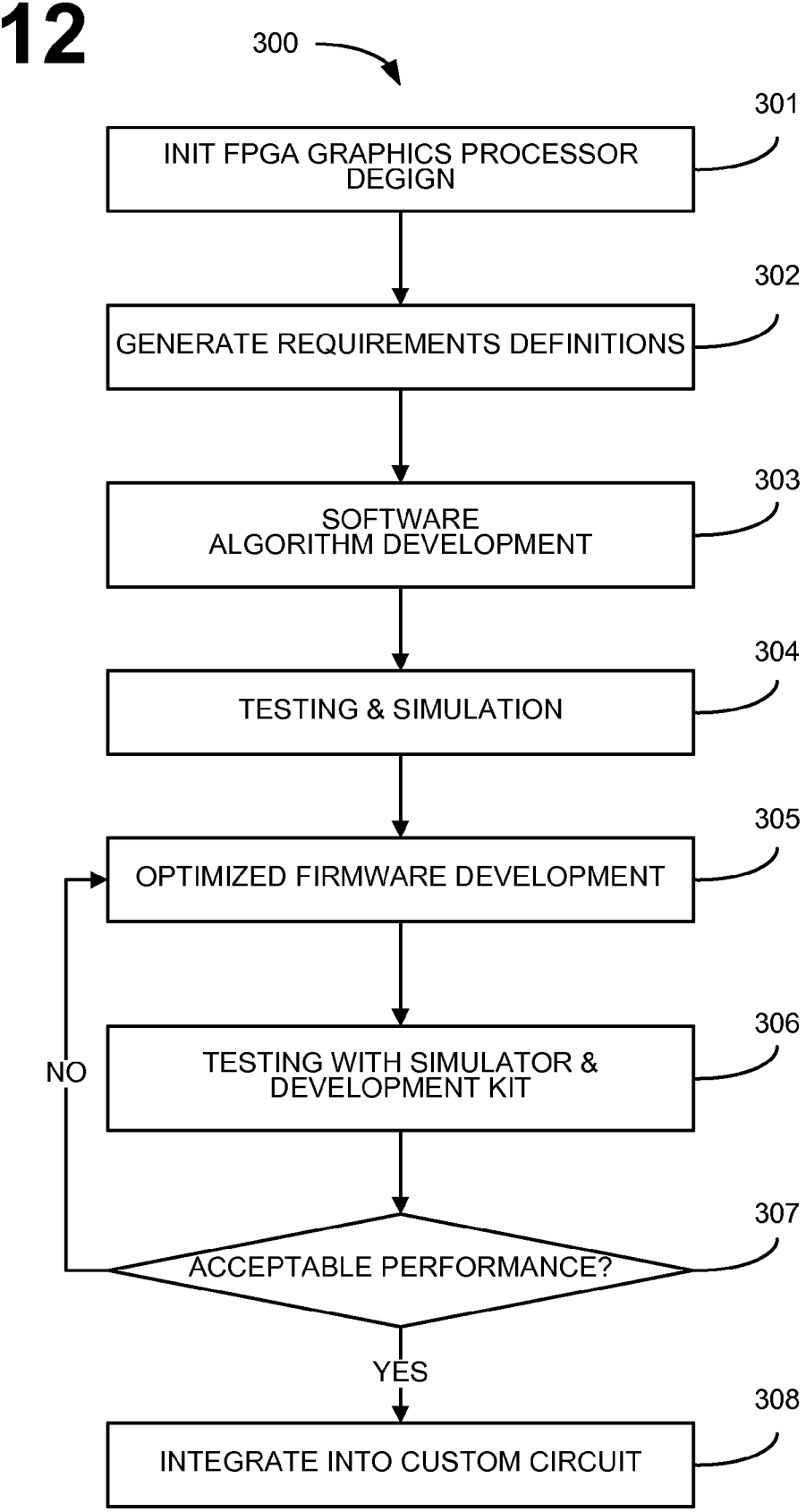

RASTERIZER PACKET GENERATOR FOR USE IN GRAPHICS PROCESSOR

CROSS-REFERENCE TO RELATED APPLICATION

This application claims the priority benefit of U.S. Provisional Patent Application Ser. No. 61/439,142, filed Feb. 3, 2011, entitled "SYSTEM AND METHOD FOR FLEXIBLE ARCHITECTURE FOR GRAPHICS PROCESSING; and this application is related to co-pending U.S. Non-Provisional patent application entitled "FPGA PACKET PROCESSING ENGINE" being filed concurrently herewith, both of which are hereby incorporated herein by reference.

TECHNICAL FIELD

The present invention relates generally to graphics processing architecture for an FPGA and, in particular, to a rasterizer architecture for an FPGA graphics processor.

BACKGROUND

Developments in the graphics processing industry have been driven in recent years, in part by, PC gaming. A typical high-end gaming workstation requires massive amounts of power and provides visually appealing functionality based on three-dimensional rendering. The resulting graphics processors produce impressively rendered images, but they also have a very limited life cycle and have more features than are required in many secondary markets.

In the past sixteen years, over 500 different graphics processing units (GPUs) have been released by the major GPU manufacturers. Once a new architecture is released, the previously released GPUs typically are not produced or even supported any longer because the market demand has shifted to the new design. This lack of device availability and support creates a tremendous challenge for industrial, safety-critical, and embedded applications that have a much longer life cycle than consumer products.

The competition between the major GPU manufacturers has been motivated by a tremendous growth in the gaming market, which grew by 75% between 2000 and 2005. Since the early 1980s, game console hardware has increased in processing frequency at a rate even exceeding the general CPU processors. The increased pressures for more and more realistic gaming has resulted in considerable focus on the hardware GPU, which could be described as a special purpose accelerator that offloads much of the rendering and rasterization workload from the CPU.

One disadvantage of these circumstances is that the GPUs are not typically suitable for embedded, low-power, or long life cycle applications. However, an advantage is the remarkable performance and interface concepts that have developed GPUs into highly parallel computing machines. The basic motivation for such parallel architectures is simply to keep the GPU processing resources busy so that the CPU can focus primarily on the application's non-graphical requirements. The software interface to the GPU is simple and does not exhibit parallelisms, but the underlying hardware is highly parallel.

The design goals for the gaming GPU architecture often are flexibility, programmability, and scalability with a high-definition output resolution. In one example, the designers use multiple CPU cores that interface to a GPU core with 48 parallel arithmetic logic units (ALUs). To reduce memory bottlenecks, DDR3 memory provides a total memory bandwidth of 22.4 Gbytes/sec. The GPU, which was released in 2005, runs at a clock frequency of 500 MHz. The GPU also has 10 Mbytes of embedded DRAM (EDRAM), which is DRAM that is integrated onto the same silicon with the rest of the GPU circuitry. This EDRAM is used to eliminate the depth buffering and alpha blending bandwidth requirements from the external memory interface bottleneck.

Since many of the GPUs that are released today have targeted such specific, high-volume applications, there are many other applications that are not being adequately addressed. As an example, industrial displays and portable displays both have unique requirements that are often unfulfilled by the mainstream graphics processors. Industrial displays typically require long life cycle support, and portable displays usually require reduced functionality to minimize cost, power, and size. There is a definite need for an alternative graphics processing solution to satisfy such secondary markets It is to the provision of solutions to these and other problems that the present invention is primarily directed.

SUMMARY

The present invention relates generally to graphics processing architecture for an FPGA and, in particular, to a rasterizer architecture for a graphics processor implemented on a FPGA.

In a first example embodiment, the rasterizer is implemented on a FPGA circuitry. The rasterizer comprises a preprocessor that creates data packets to generate at least one line, a main module that generates a stream of data fragments that become pixels, and a postprocessor that combines the data fragments and pipeline commands into one output to a fragment processor.

In a second example embodiment, rasterizer is implemented on a field programmable gate array circuitry by a method in a computer-aided design system for generating a functional design model of a rasterizer for a graphic processor device. The method comprising generating a functional representation of a preprocessor creates data packets to generate at least one line, generating a functional representation of a main module that generates a stream of data fragments that become pixels, and generating a functional representation of a postprocessor that combines the data fragments and pipeline commands into one output to a fragment processor.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 12 is a flow diagram of a design process used in semiconductor design, manufacture, and/or test.

DETAILED DESCRIPTION OF EXAMPLE EMBODIMENTS

Figure 1:
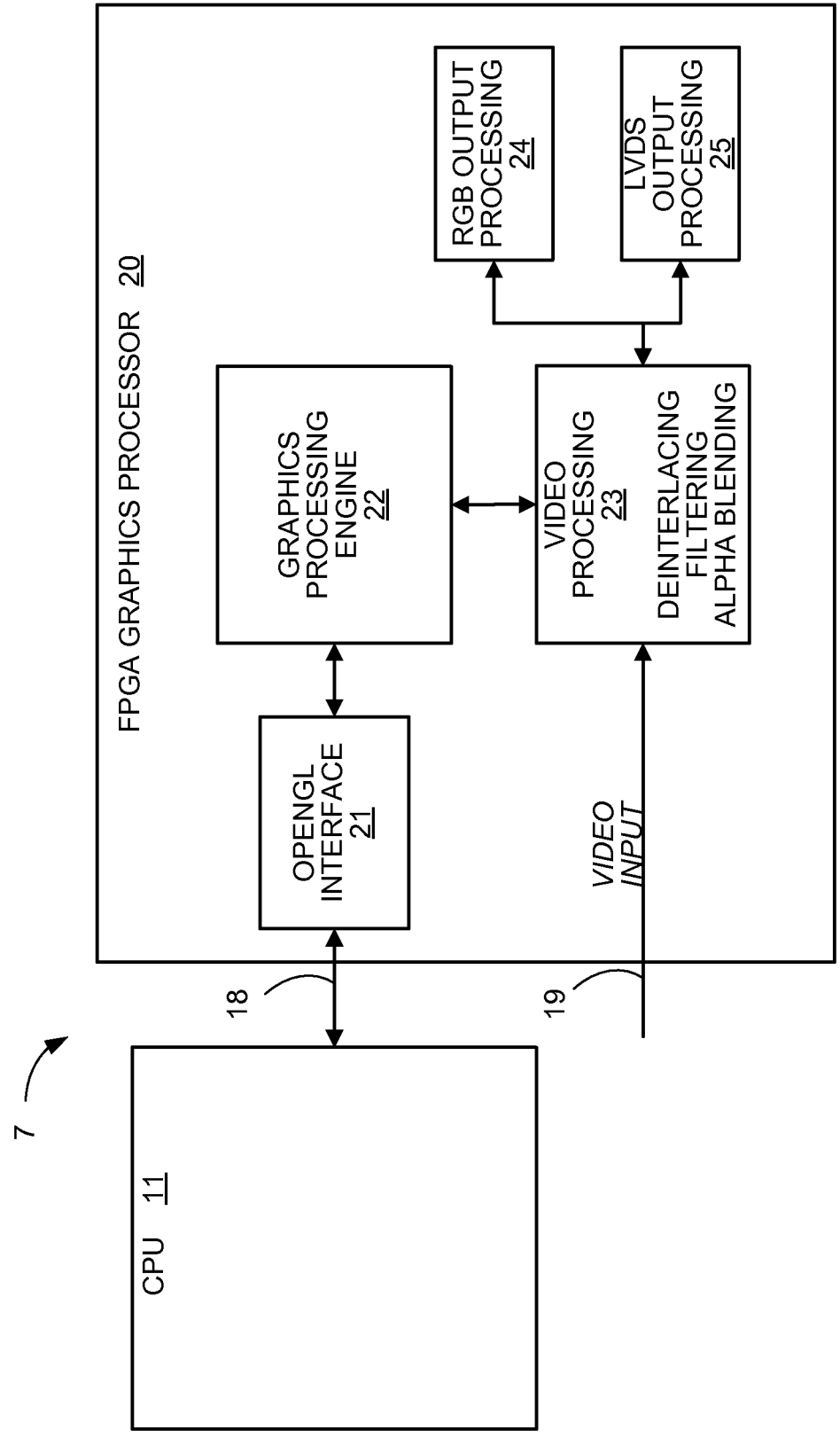
FIG. 1 is a block diagram of a graphics processing in conjunction with a CPU according to one example embodiment of the present invention.

Generally described, the present invention relates generally to graphics processors and, in particular, to a graphics processing architecture that was developed specifically for an FPGA.

The present invention provides at least four contributions in the area of FPGA-based processing. First, a graphics processing architecture that was developed specifically for an FPGA. This architecture is significant in that the overall structure as well as each module were developed to accentuate the FPGA's advantages while diminishing the FPGA's shortcomings. The architecture is highly modular to allow for each functional block to be scaled up or down according to an application's requirements. The use of an FPGA as the final target for the architectural design mitigates the risk of device obsolescence and allows the FPGA to be crafted specifically for specific application requirements.

The second is a rasterizer architecture that uses a multithreaded soft-core processing approach. The rasterizer is the most significant module in the GPU pipeline. There are many possible techniques for rasterizing lines in an FPGA, but this approach is unique in that it is highly scalable to support nearly eight times its performance with very little impact to the design. The rasterizer receives commands and vertices from a vertex processor and generates fragments for the fragment processor. The output of the rasterizer is a stream of fragments that may eventually become pixels in the frame buffer operator. Each fragment has a 32-bit color value as well as a 20-bit XY coordinate. The rasterizer can produce shaded and/or anti-aliased primitives.

Several architectural options were considered for the rasterizer. However, to provide easy scalability for many different performance levels, the rasterization engine exploits a high-performance packet processing engine. The rasterizer's packet processing framework uses a task/event relationship between a multithreaded soft processor and hardware acceleration blocks. This FPGA-based GPU pipeline provides a unique set of requirements that make the packet processing perspective an appropriate one. This disclosure provides an overview of the packet processing engine, then explains how the engine is used for rasterization, and finally presents some data concerning scalability and extendibility.

The third contribution is the unique simulation approach developed to accelerate the analysis of FPGA-based processing. This approach uses a combination of standard simulation tools along with custom developed utilities to provide a fully automated visual output based upon the FPGA design. For each simulation, the output is presented not only in a waveform but also in a text file and a visual bitmap file. The architectural advances achieved here in were facilitated by the automated visual simulation. This same simulation approach could be leveraged for many other research areas, such as video filtering or sensor fusion.

The fourth contribution is the extendibility of the FPGA-based graphics processing architecture to support applications broader than just basic graphics processing. The architectural extensions for supporting comprehensive graphics processing that includes vertex processing, fragment processing, and texture management as described here in. This document further describes how this FPGA-based graphics processing architecture can also be leveraged in general-purpose computations or scientific visualizations, which combine computations with graphics processing. Together, these extensions demonstrate that this FPGA-based graphics processing architecture has a much broader impact than just basic graphics processing.

FPGAs are essentially fabrics of customizable logic gates and have been used for many years to implement specific functions that are not available in standard ASICs. FPGAs continue to advance with new technology to take advantage of the smaller die geometries that improve cost efficiency and performance. Each new generation of FPGA devices reduces power and cost while increasing performance and flexibility. In addition, more hard silicon structures are being added to FPGAs, such as DSP blocks, PCIe cores, and serializers and deserializers. These non-programmable features offload some of the processing burden from the programmable logic.

FPGAs can often be considered the foundation in the design of custom computing or reconfigurable computing applications. When an application requires custom hardware-based processing, an FPGA is often the first choice because of its flexibility, availability, and relatively low cost. For higher volume applications, a custom ASIC can be developed based on the initial FPGA design. However, such a customized chip requires a significant upfront financial investment.

FIG. 1 is a block diagram of a graphics processing in conjunction with a CPU according to one example embodiment of the present invention. The CPU 11 handles all communication to the external and internal buses and also controls the system. The FPGA graphics processor 20 provides the RGB output from the RTP outputting processing block 24 and video streaming from the LVDS output processing block 25.

Figure 2:
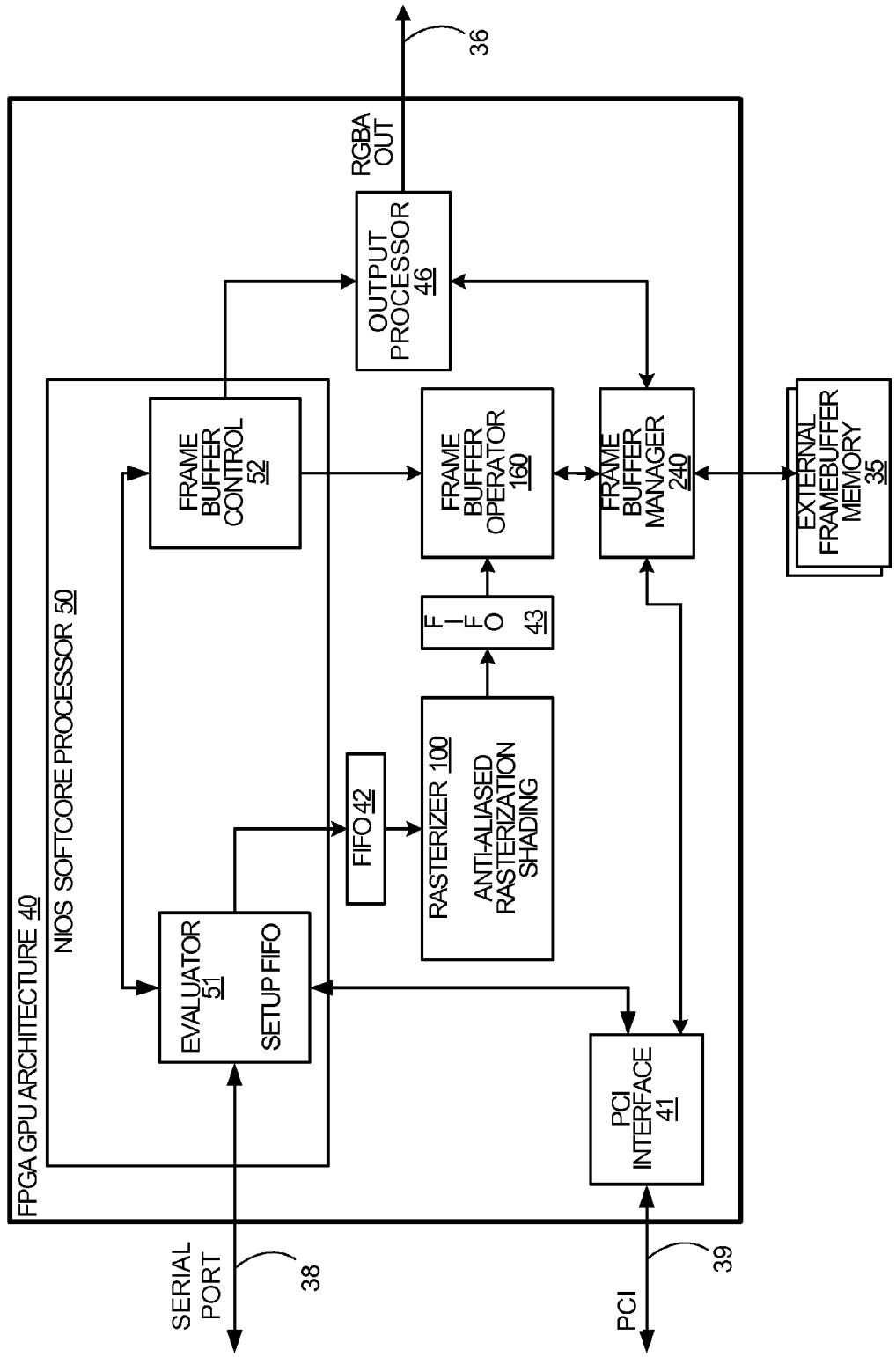
FIG. 2 is a block diagram of a graphics processing unit implemented in a FPGA according to one example embodiment of the present invention.

FIG. 2 is a block diagram of a graphics processing unit implemented in a FPGA according to one example embodiment of the present invention. This architecture provides basic graphics processing capabilities suitable for many applications, including industrial displays, automotive displays, avionic displays, and other embedded products. In many industrial or embedded applications, the host application generates menus or graphical overlays by specifying vertices in screen coordinates with defined colors. This basic architecture does not include vertex processing because coordinate transformations and lighting calculations are not needed. Based upon commands and vertex data (color and position) from the host application, the FPGA can generate anti-aliased points, lines, or triangles. Smooth shading and alpha blending are also incorporated to produce more realistic imagery.

The overall structure of the GPU architecture is motivated by the OpenGL pipeline, with distinct blocks assigned along the pipeline for specific functions. The architecture, shown in FIG. 2 as a block diagram, establishes a flexible-function pipeline as opposed to the typical terms of fixed-function or programmable. The flexible-function pipeline, because of its modularity and re-programmability, can be easily modified or scaled up or down to meet specific requirements of many different applications. The re-programmability provides a key advantage over traditional fixed-function pipelines because it allows customizations and adjustments to permit functionality that was previously not possible. As an example, a unique alpha blending algorithm can be implemented very quickly and incorporated into the FPGA by modifying only one module. This capability is simply not possible with fixed-function GPU pipeline architectures, although it is available in the most recent ASIC GPU architectures with programmable pipelines.

The architecture illustrated in FIG. 2 was developed with five distinct modules so that the performance or functionality of any one block could be easily adapted for different applications. The Nios® II CPU 50 is an embedded soft-core processor that receives graphical commands and data from the CPU 11. The host interface software in the Nios® II sets up the first pipeline FIFO with the necessary data, and it also controls high-level parameters such as resolution and frame rate. To maximize graphics throughput, the Nios® II CPU 50 only sets up the pipeline and controls some of its timing, and it is not involved in later stages of the GPU pipeline.

The hardware pipeline is based upon several scalable modules with FIFOs nested between them to provide buffering and diagnostic capabilities. The fill level of each FIFO is used to characterize pipeline inefficiencies for further optimizations. The FIFOs use the FPGA's on-chip memory blocks for minimum latency. After the initial pipeline optimization and integration phase, the FIFOs are used to provide flow buffering to compensate for the asynchronous or unpredictable input from the host. The FIFOs contain vertex or fragment data as well as all commands that affect the processing in the pipeline. The commands remain sequenced together with the graphics data to ensure that the commands are executed at the correct time relative to the vertices or fragments being processed.

The Nios® II CPU 50 includes an evaluator 51 that is a software module that easily customized for different host interfaces or drivers. A rasterizer 100 employs a packet-processing platform to generate fragments in a very unique way. The third module, the frame buffer operator (or manager) 44, uses parallelism, DSP blocks, and on-chip memory to test and blend four fragments at once. The frame buffer manager 44 uses a state machine to handle priorities with the external frames buffer memory 49. Finally, the output processor 75 uses a large FIFO (not shown) to ensure that the data is transmitted with correct timing despite the different clock domains. Each of these five major modules is explained in more detail in the following sections.

The evaluator 51 serves as the host interface to receive graphical commands or data and format them for use by the GPU pipeline. The Nios® II soft-core processor 50 is chosen to implement the evaluator 51 to take advantage of existing advantages of for the UART serial interface 32. While the serial interface 32 is not used as the primary means of transferring data from the host application, it is extremely useful for pipeline control as well as analysis and diagnostics. The throughput and/or status of any module in the pipeline can be quickly queried and determined. The Nios® II soft-core processor 50 uses general-purpose I/O (GPIO) signals to retrieve statuses from the individual blocks in the pipeline. In addition, a bitmap capture of the entire frame buffer operator 43 contents can be retrieved with the use of the evaluator 51. When commanded, the evaluator 51 will transmit out one pixel at a time over the serial interface 32 back to a host computer. A separate utility on a host computer can convert a text file of pixel data into the bitmap format.

The primary responsibility of the evaluator 51 is to set up the graphics commands and vertex data into structures that are written into the FIFO buffer 42. All commands, vertices, and fragments flow through the pipeline in sequence so that the commands that change the pipeline are processed at the correct time relative to the vertices and fragments. There are multiple FIFOs 42 and 43 along the pipeline to allow for storage while the downstream modules are continuing to process previous data. The sizes of the FIFOs 42 and 43 are adjustable based on the performance characteristics of each processing module. The data in each FIFO 42 and 43 is composed of at least ten bytes, with the first byte defining the type of data. For different applications that use a unique interface or driver on the host CPU 11, only the evaluator module 51 would have to be modified. The pipeline data format is flexible enough that it can remain the same so that the downstream pipeline modules would not need to be altered.

Because the GUI 40 and serial interface 32 of the evaluator 51 allow for the GPU 40 pipeline to be exercised, analyzed, and evaluated. The PCI interface 31 simply maps to internal registers in the evaluator 51, and then the evaluator 51 formats the data for insertion into FIFO 42 and the GPU 40 pipeline.

The rasterizer 100 is a significant module in the GPU 40 pipeline. The rasterizer 100 is responsible for interpolating between vertices to generate lines and filling between triangle edges to generate triangles. The output of the rasterizer 100 is a stream of fragments that may eventually become pixels in the frame buffer. Each fragment has a 32-bit color value as well as a 20-bit XY coordinate. The rasterizer 100 can produce shaded and/or anti-aliased primitives.

In one embodiment, the rasterizer 100 includes a purpose-built hardware block to generate fragments based upon input vertices. However, another embodiment provides easy scalability for many different performance levels, the rasterization engine of rasterizer 100 exploits a high-performance packet processing engine. This packet processing framework uses a task/event relationship between a multithreaded soft processor and hardware acceleration blocks. The packet processing platform has a very small footprint but contains all of the necessary controls and interfaces to attain high performance. The soft processor uses hardware multithreading to execute up to eight threads at once. There are eight sets of registers and program counters so that each thread operates independently of the other threads and the registers can be switched in and out with zero latency. The performance of the packet processing is maximized with the use of hardware accelerators called event modules. The hardware input event module first calls a task in the soft processor with a new packet ID. The processor can then offload processing to hardware by passing the packet ID to an event module. The packet alternates back and forth between hardware and software until it has completed processing, at which time an output event module releases the packet ID. Up to 64 packets can be in the system at one time. The rasterization engine of rasterizer 100 is herein defined in further detail with regard to FIGS. 6A and 6B.

Figure 3:
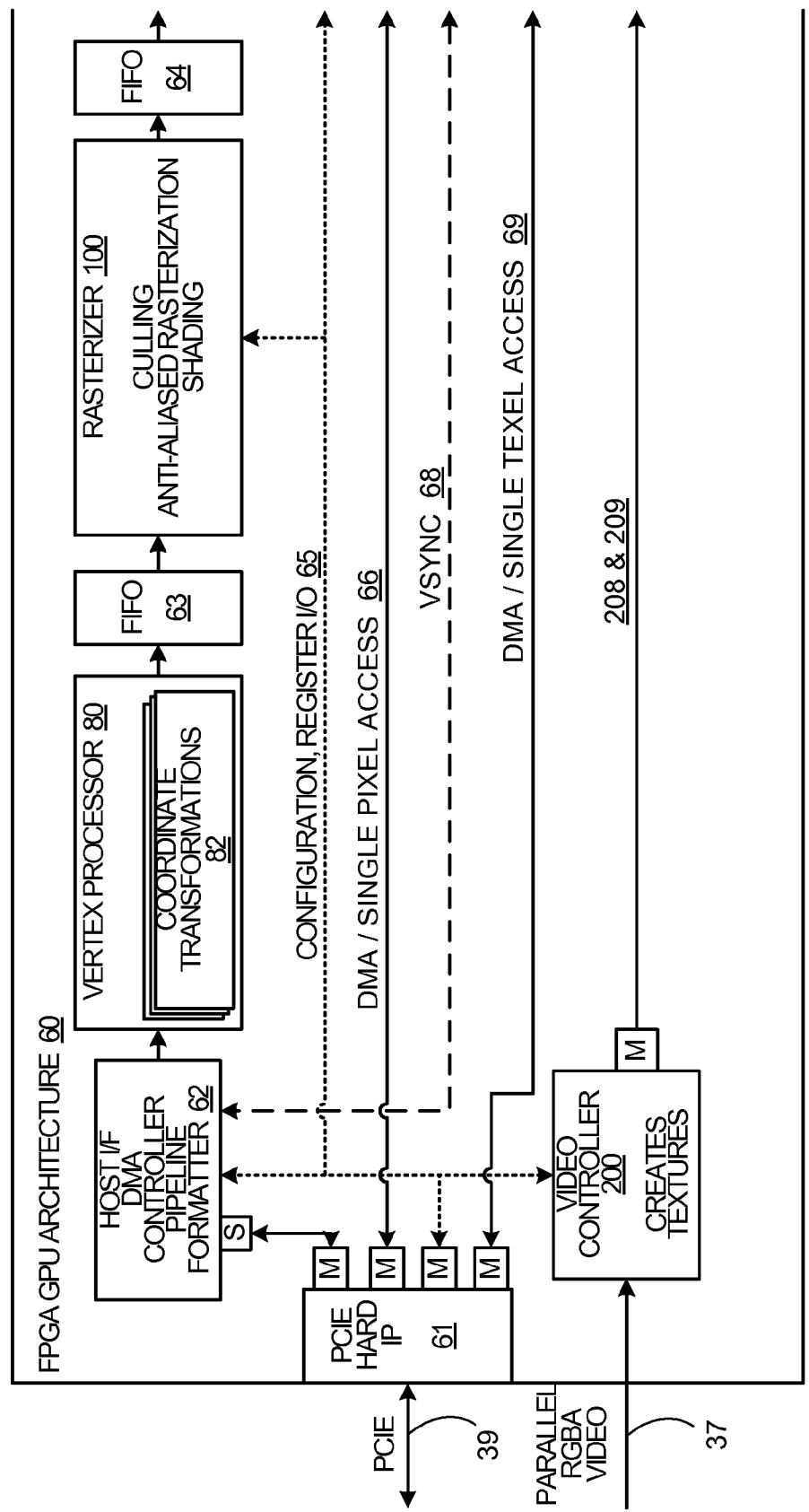
FIGS. 3 and 4 are block diagrams of a graphics processing unit implemented in a FPGA according to second example embodiment of the present invention.
Figure 4:
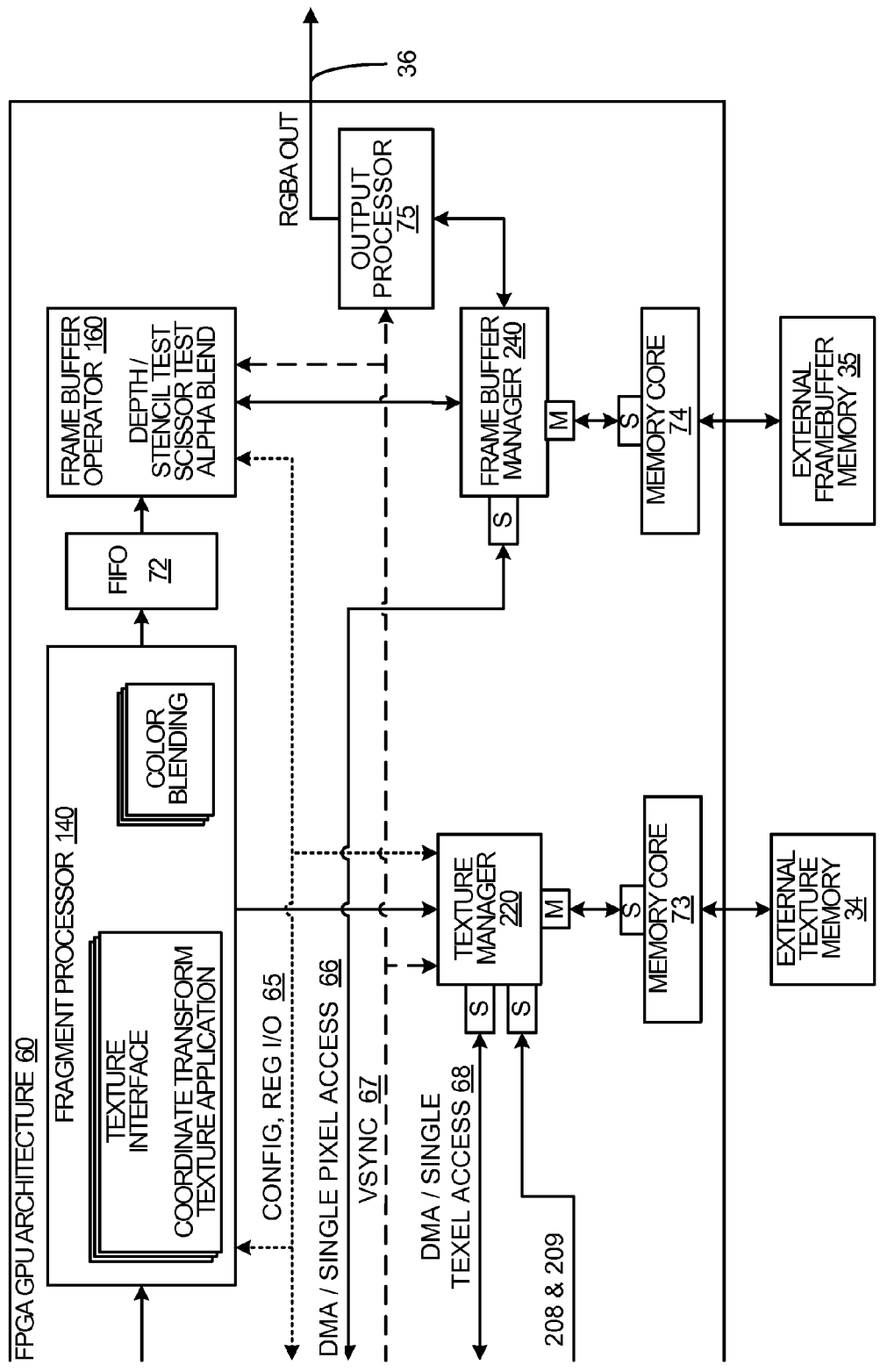

FIGS. 3 and 4 are block diagrams of a graphics processing unit 60 implemented in a FPGA according to second example embodiment of the present invention.

The basic FPGA GPU architecture 60 provides all of the functionality required for many industrial, embedded, or portable applications. To demonstrate its scalability to broader applications, the FPGA GPU architecture 60 can be extended to accommodate the vertex processing, fragment processing, and even streaming video as textures. The result is a GPU pipeline described in FIGS. 3 and 4 provides hardware acceleration for all of the functionality in the OpenGL SC specification. The hardware acceleration is significant because many GPUs actually depend on their software drivers to provide the vertex processing or fragment processing. These software implementations constrain performance because they do not take full advantage of the parallelism available in a GPU. Through the extensions shown in this chapter, all of the OpenGL functionality is provided with true hardware acceleration in the FPGA.

The recommended architectural approach for a full OpenGL SC GPU pipeline is shown in FIGS. 3 and 4. This architecture uses the same FIFO-based approach to interconnect the modules in the pipeline as illustrated in, with some new modules added in the war increased functionality. The new pipeline modules for the comprehensive graphics functionality are the vertex processor 80 and the fragment processor 140. To support the increased functionality, a texture manager 220 and a video controller 90 have also been added.

Figure 5:
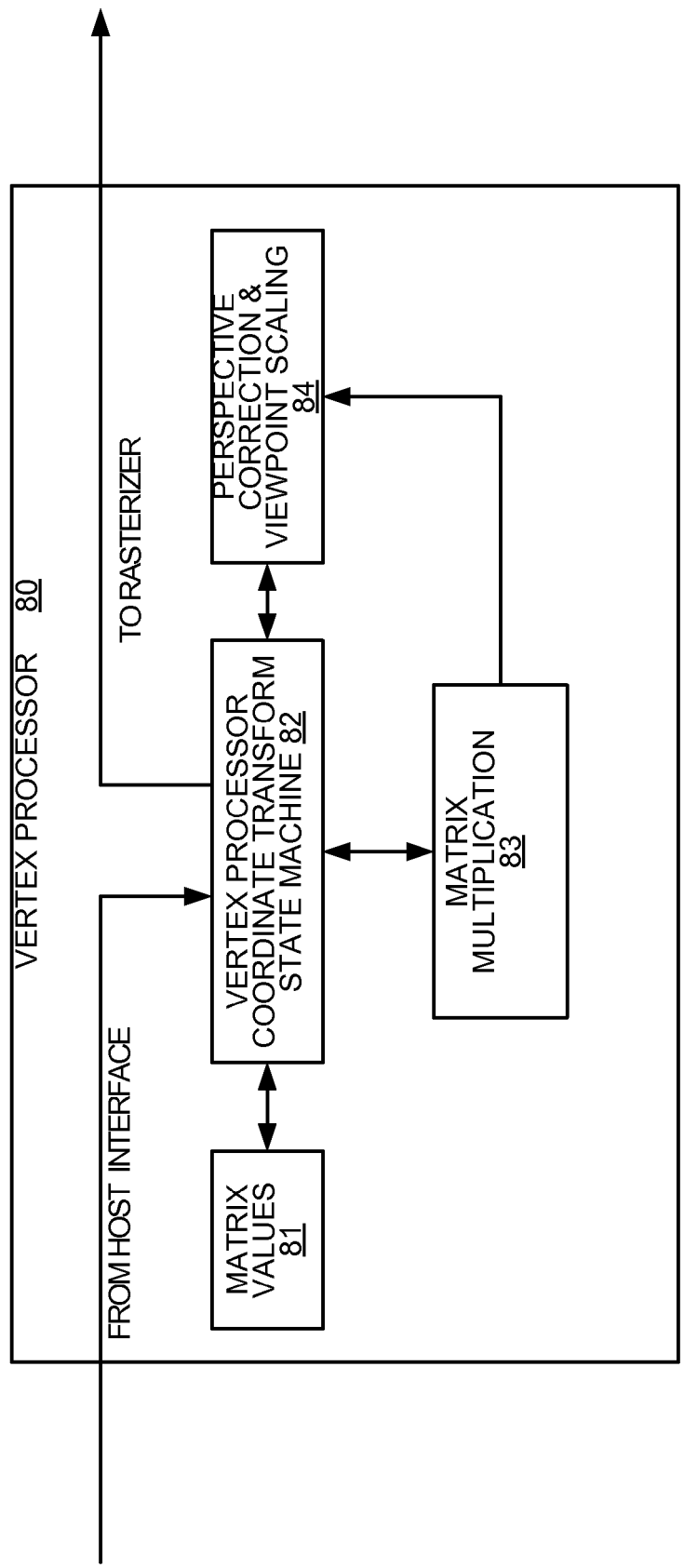
FIG. 5 is a block diagram of a vertex processor in the graphics processing unit implemented in a FPGA according to one example embodiment of the present invention.

FIG. 5 is a block diagram of a vertex processor 80 in the graphics processing unit 60 implemented in a FPGA according to one example embodiment of the present invention.

The vertex processor 80 is responsible for transforming vertex coordinates and applying lighting calculations to vertices. As each vertex enters the vertex processor 80, it consists of a three-dimensional coordinate and a base color (red, green, blue, and alpha). Based upon the settings of the vertex processor 80, the coordinates and the color will be transformed before the vertex outputs from the vertex processor 80. The transforms and lighting algorithms are well defined by OpenGL, but their implementations are not specified. A soft-core processor could be used to handle the vertex processing with maximum flexibility, but the significant mathematical burden would be best suited for hardware acceleration. The remainder of this section is segregated into portions that first discuss the coordinate transformation and then deal with the lighting calculations.

The coordinate transformations are based upon two user-defined 4×4 matrices, the modelview matrix and the perspective matrix. Initially, the vertices are received from the host interface 62 with their coordinates in modeling space. These vertex coordinates are first multiplied using matrix multiplication module 83 by the modelview matrix to transform the coordinates into eye space. Next the coordinates are multiplied by the perspective matrix using matrix multiplication module 83 to obtain the vertex in perspective coordinates. The perspective factor (w') that results from this perspective multiplication ([x y z 1]→[x' y' z' w']) is used to divide into each of the XYZ coordinates to provide the perspective correction. The final coordinate transformation 84 scales the perspective coordinates (range from [0,0] to [1,1]) into the defined viewport resolution. The result is a set of coordinates that are defined in the range of actual screen coordinates and therefore can be used by the rasterizer 100.

The architecture for implementing the vertex processor 80 could be optimized for speed or area. For optimum speed, many of the calculations need to be completed in parallel at the expense of an increase in the required FPGA resources. However, since vertices are processed much less often than fragments (i.e. there are typically many fragments generated per set of vertices), the vertex processing architecture is optimized based on area, or FPGA resources.

Each matrix multiplication requires sixteen multiplications and twelve additions, which together consumes eight DSP blocks. The architecture shown in FIG. 5 uses the matrix multiplication module 83 to perform both the modelview and perspective transformations. The coordinate transform state machine 82 stores the matrix values from the host interface and then multiplexes them into the matrix multiplication module 83 based upon the stage of vertex processing. This resource reuse means that only one vertex can be processed at a time. However, the six-cycle latency to complete each coordinate transformation is relatively short compared to the amount of time spent rasterizing and processing fragments based upon the vertices.

The OpenGL SC lighting equation is shown below and defines the variables. The emissive and ambient contributions are listed at the beginning of the equation, and then the contribution from each light in the scene is summed together. The mathematical calculations required for diffuse and specular lights are significantly more involved than the ambient lights. Diffuse lights require the dot product of a normal vector with the light position vector. Specular lights require the dot product of the normal vector with a half vector, which is the summation of the light and eye vectors. In addition, specular lights require an exponential multiplication which is limited to an integer from 0 to 128 in this architecture. Each of the variables is passed into the vertex processor 80 by the host interface 62. The summation limits the scene to eight light sources, but this maximum is arbitrary based upon knowledge of requirements from reasonable applications. A similar approach could support more than eight light sources at the expense of additional delay based upon the number of lights.

$$\text{Vertex color} = M_E + (S_A \times M_A) + \sum_{8lights} [(L_A \times M_A) + (L_D \times M_D \times N \cdot L) + (L_S \times M_S \times (N \cdot H)^{Sh})]$$

The lighting calculation requires several operations that are not standard combinatorial or sequential logic in an FPGA. The normal vectors, dot products, cross products, and exponential multiplication all requires analysis to devise an approach in the FPGA architecture. The normal vector is essentially a cross product between the two vectors associated with the vertex. The cross product has been decomposed into the simplification shown in the equation below because the vectors are known to be three dimensional.

$$N = V_1 V_2 \times V_1 V_3 = ([V_{2y}-V_{1y}]*[V_{3z}-V_{1z}] - [V_{2z}-V_{1z}]* [V_{3y}-V_{1y}], [V_{2z}-V_{1z}]*[V_{3x}-V_{1x}] - [V_{2x}-V_{1x}]* [V_{3z}-V_{1z}], [V_{2x}-V_{1x}]*[V_{3y}-V_{1y}] - [V_{2y}-V_{1y}]* [V_{3x}-V_{1x}])$$

In the lighting equation, the normal vector is always used in conjunction with a dot product, so the further simplification was made as shown in equation below.

$$N \cdot M = N_1 M_1 + N_2 M_2 + N_3 M_3 = ([V_{2y}-V_{1y}]*[V_{3z}-V_{1z}] - [V_{2z}-V_{1z}]*[V_{3y}-V_{1y}])*M_1 + ([V_{2z}-V_{1z}]*[V_{3x}-V_{1x}] - [V_{2x}-V_{1x}]*[V_{3z}-V_{1z}])*M_2 + ([V_{2x}-V_{1x}]* [V_{3y}-V_{1y}] - [V_{2y}-V_{1y}]*[V_{3x}-V_{1x}])*M_3$$

In addition to the normal vector calculations and dot products required, the vector processing also requires matrix inversion and square root operations.

Once all of the approaches were devised for accomplishing the required mathematical operations, the overall calculations had to be sequenced and controlled to produce the final result. The coordinate transform state machine 82 shown in FIG. 5 essentially acts as a large while loop to sum together the contribution from each of the eight lights. Based on the latency for each calculation in the equation, the coordinate transform state machine 82 latches the intermediate outputs as soon as they are available. For example, when the specular light's shininess factor is greater than one, multiple clock cycles are required to iteratively perform the exponential operation as a sequence of multiplications.

Figure 6A:
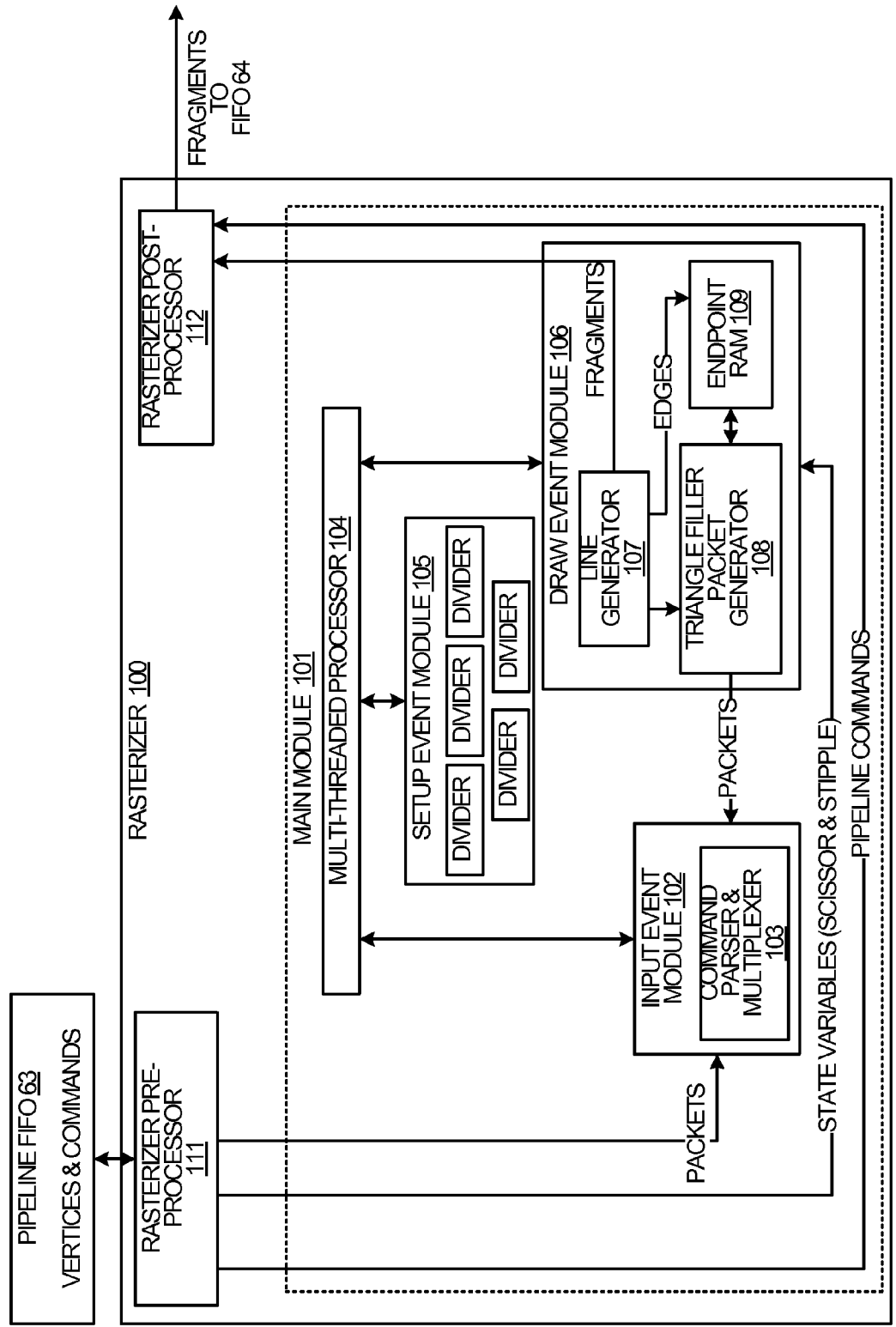
FIG. 6A is a block diagram of a rasterizer in the graphics processing unit implemented in a FPGA according to one example embodiment of the present invention.

FIG. 6A is a block diagram of a rasterizer 100 in the graphics processing unit 60 implemented in a FPGA according to one example embodiment of the present invention. There are three top-level modules in the rasterizer 100: pre-processor 111, main 101, and post-processor 112. The main module 101 is composed of several smaller modules.

The migration of the packet processing platform into a graphics rendering application provides novelty to this invention. The goal of the rasterization engine is to generate fragments (in-process pixels) as quickly as possible after being given the two endpoints of a line or the three vertices of a triangle. Anti-aliasing can be enabled or disabled, which ultimately results in two different algorithms merged into one process. The rendering of a triangle is essentially an extension of line rendering.

Figure 6B:
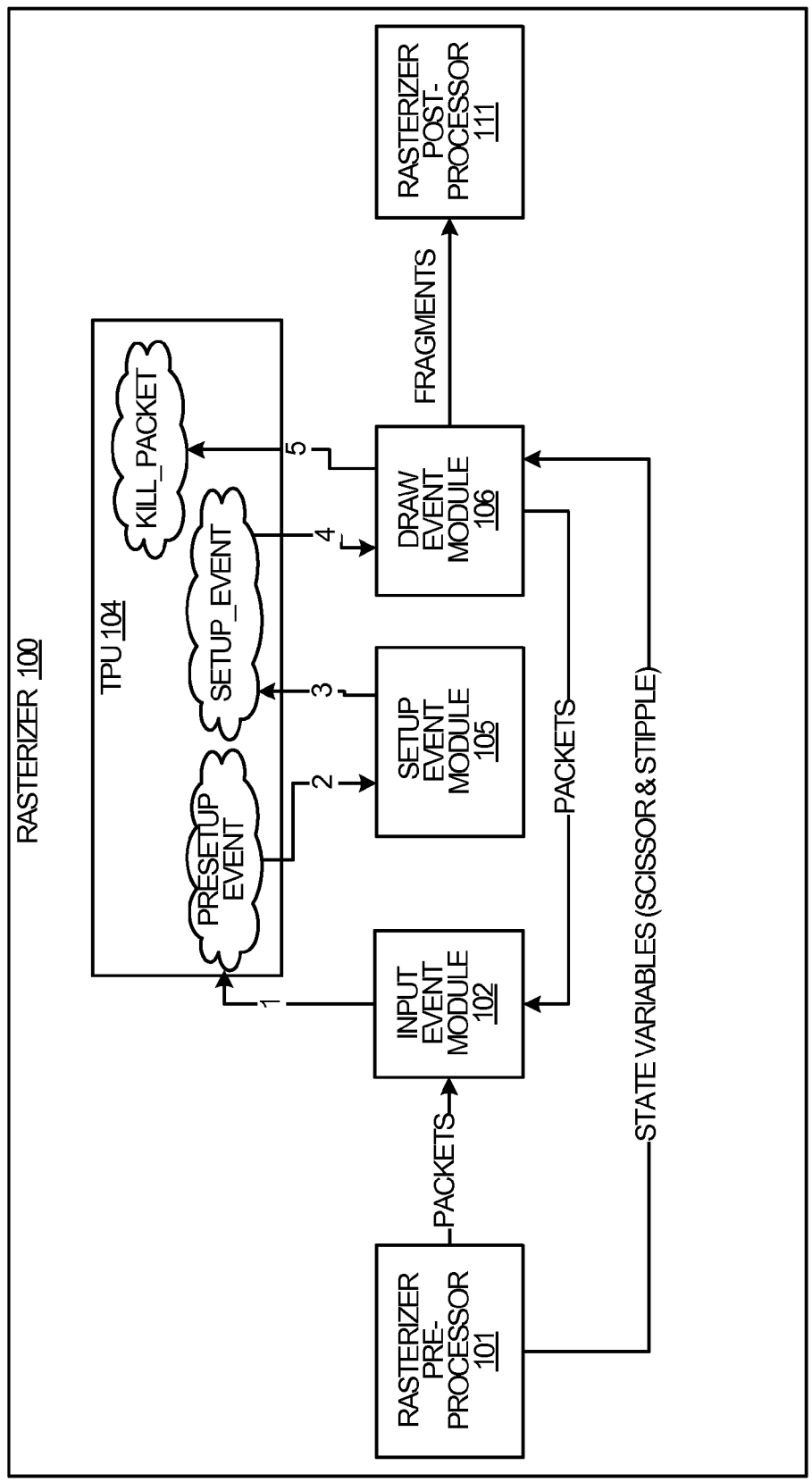
FIG. 6B is a block diagram of the operation of the rasterizer in the graphics processing unit implemented in a FPGA according to one example embodiment of the present invention.

An analysis of the line rasterization computations allowed a separation between setup and recursive portions. In this architecture, the multithreaded soft processor 104 is responsible for much of the setup portion of the algorithm, and hardware acceleration blocks implement the recursive portion. The division computations required in the line setup are offloaded to hardware as well. FIG. 6B shows how the rasterization functionality is partitioned within the packet processing platform.

The rasterizer pre-processor 111 (i.e. packet generator) receives commands and vertices from the Pipeline FIFO 63 and creates packets that the input event module 102 can accept. The interface has been standardized to provide an extremely flexible, high-bandwidth streaming protocol. The input event module 102 parses the packet and issues the initial setup task in the multi-threaded processor 104. After the multi-threaded processor 104 determines which axis is dominant (has a larger change in value) in the line, it sequences the vertices so that the vertex coordinates increase along the dominant axis. Next, the multi-threaded processor 104 offloads the slope and color gradient calculations to a setup event module 105. The slope and gradients are sent back to the multi-threaded processor 104 via another task call. The multi-threaded processor 104 then collects all of the necessary data and issues an event call to the draw line event module 106. At the completion of the line, the draw event module 106 issues a task back to the multi-threaded processor 104 to provide notification that the packet has completed processing.

There are a couple of different anti-aliasing techniques, as well as scan conversion methods, which are the processes for converting each polygon into a series of horizontal lines. Some anti-aliasing techniques, such as full-scene anti-aliasing or super-sampling, are somewhat independent of the rasterization, but primitive-based anti-aliasing actually happens during the rasterization. For anti-aliased triangles, only the edges need the special treatment that results in a smoothed appearance. Full-scene anti-aliasing is wasteful for large triangles because the ratio of interior fragments to edge fragments is so low. Instead, a more optimum method is to anti-alias only the outer edges of the triangle. There are two ways to generate anti-aliased triangles in this manner.

The first anti-aliased triangle algorithm fills horizontal lines along sub-scanlines and produces a triangle that is actually at a higher resolution. The sub-scanlines are then merged back down to the desired resolution by generating a coverage value for each x-coordinate in the line. This coverage value determines the weighting or shading of the edge fragments on each line. The second anti-aliased triangle algorithm draws the anti-aliased edges first and then goes back to fill in the triangle interior with horizontal lines. This algorithm is more efficient for large triangles and actually takes advantage of the FPGA's internal block RAM as described in the following paragraph. Both anti-aliased triangle algorithms were implemented and evaluated, and the second algorithm was selected for this basic graphics architecture.

To rasterize the triangle, the multi-threaded processor 104 first determines which side of each line is on the outer edge of the triangle. This characteristic is important when anti-aliasing triangles so that only the outer edges are smoothed. Otherwise, artifacts would be generated during the triangle filling. The steps for generating a triangle are shown in FIG. 6B, where each line is numbered to indicate the order of operations and all of the shaded boxes indicate hardware functions. First the triangle command packet is parsed and sent to the multi-threaded processor 104. The packet then bounces between hardware and software to create the three triangle edges. As the edges are generated, the endpoints for each interior horizontal line are saved into an endpoint RAM. At the conclusion of the third edge, the embedded endpoint RAM is searched to find which horizontal lines need to be created to fill the triangle. Finally, new horizontal line command packets are generated and sent back through the rasterizer 100.

The rasterizer 100 has a rather simple goal of creating fragments based upon input vertices. However, this architecture's rasterizer is unique in that it is highly scalable with very little additional effort required. The performance of the rasterizer 100 is directly dependent on the operation of the draw event module 106, whose performance bounds the overall throughput of the rasterizer 100. Thus, the rasterizer 100 basically only uses one thread out of the eight threads possible because the multi-threaded processor 104 is always waiting on the draw event module 106 to accept another event. To double the fill rate of the rasterizer 100, the draw event module 106 can be replicated. This small change allows twice as many fragments to be generated. Up to eight draw event modules 106 could be added to the rasterizer 100, which would essentially maximize the performance. In addition to the extra draw event modules 106, a post-processor block 112 also has to be added to the rasterizer 100 to collect the fragments from each line generation and write them into the frame buffer operator FIFO 72.

As the pipeline is made more parallel to accelerate performance, other synchronization issues develop. The OpenGL pipeline dictates that commands (state changes) and vertices/fragments must stay in order throughout the pipeline. When the processing is split out into parallel data paths, a mechanism must be developed to synchronize all of the configuration states. This issue was analyzed a couple different ways before a final approach was implemented. In the configuration tag approach, a small tag (i.e. in one embodiment 8 bits should suffice) could be added to each fragment that exits the rasterizer 100. The tag would be an index into a look-up table that is updated by the rasterizer 100 each time any of the state variables is modified. The frame buffer operator 160 could then lookup the state configuration that is associated with the fragment and act upon it accordingly. However, this configuration tag approach, while using the FPGA's fast internal block memory 74 for the look-up table, requires extra clock cycles for every single fragment.

An alternate approach is simply to stall the rasterizer 100 whenever a state changing command enters the rasterizer 100, and then to pass or act upon the command only after the rasterizer 100 is empty. This approach definitely decreases the performance, but only when commands are used often. If the pipeline is relatively stable (e.g., anti-aliasing is always on, or alpha blending is always off), then this approach provides acceptable performance. However, a third approach compromises between tagging each fragment and stalling the pipeline. If the rasterizer 100 maintains all of the state variables and sends out state refreshing packets between each primitive, then each fragment is not delayed during processing and the rasterizer 100 can continuously process vertices. This approach works because commands will never enter the pipeline in the middle of a primitive. The entire primitive will always have the same state, so the state only needs to be updated (at most) between each primitive.

To optimize performance even further than the approximately 8× improvement that can be made with the packet processing engine, the rasterizer 100 can be easily extended to generate filled circles in addition to triangles. In OpenGL, a filled circle is typically rasterized with the triangle fan primitive, which is a sequence of triangles with adjoining sides. Each triangle in the fan can be thought of as a pie slice. Each triangle is filled separately, and the end result is a filled circle. However, this approach is very time consuming because each radial line has to be rasterized and then each very small triangle is filled. In a typical horizontal line fill, the memory bandwidth is maximized because the memory addresses along the line are contiguous and burst memory accesses can be used. By using multiple filled triangles instead of a continuous horizontal line, the operation is broken into multiple steps and the bandwidth efficiencies of line filling are lost.

A more efficient approach would take advantage of the RAM 74 structure that is built into this architecture to fill in polygons. In the approach, the circumference of the circle could be drawn with either a line strip primitive or even a circle algorithm. Using a line strip primitive would mean that the application would provide each of the vertices along the periphery of the circle, and the rasterizer 100 would draw very small line segments between vertices. Alternatively, a circle algorithm only requires the application to provide the center and radius of the circle. This algorithm works with simple addition and rounding. As the circumference is drawn (with either a line strip or the circle algorithm), each of the fragments is loaded into the endpoint RAM 74 in a manner very similar to that of the triangle rasterization. When the circle circumference has been generated, the interior can be filled just by stepping through the endpoint RAM 74, drawing horizontal lines according to the endpoints specified.

The performance improvement is significant because as the circle radius increases, the number of memory accesses for each individual radial segment increases as well. Unless some memory addresses are adjacent, only four individual fragments can be written during each memory access. Thus, for a radius of 50 pixels, 13 memory accesses are required for the majority of the radial segments. Alternatively, the optimized approach writes up to 32 pixels during each memory access by organizing the circle fill along horizontal lines.

FIG. 6B is a block diagram of the operation of the rasterizer 100 in the graphics processing unit 60 implemented in a FPGA according to one example embodiment of the present invention.

The rasterizer 100 main module is based upon a multi-threading packet processing engine 104. There are three hardware event modules that interact with the TPU 104 to generate fragments: Input, Setup, and Draw. Each of these modules is described in detail below. In addition, there are 3 main software tasks that run in the TPU 104: PreSetup_Event, Setup_Event, and Kill_Packet. The overall flow of a packet is shown below.

The input event module 102 parses incoming packets and prepares them for processing in the TPU 104. For line and triangle generation packets that are received, a task register and header registers are generated. At least 1 TR and 1 HR should to be issued in order for the TPU 104 to release a packet ID, which initiates the packet processing. The input event module 102 initiates the processing.

The presetup event task is software that executes in the TPU 104. This task decodes the command bits to determine how to interpret the vertex data in the header registers.

The first step is to calculate the absolute value of delta X and delta Y. During this step, a bit is saved to remember if the real value of the delta is a negative number. This bit is called the Swap bit to indicate that the vertices were swapped to avoid a negative delta. The next step is to determine the dominant axis. The absolute values of delta X and Y are compared. The larger value indicates which axis is dominant. The delta on the dominant axis is saved in a context register (CR2) as the number of steps, which is used later in the Setup Event Task. The delta for each color and each texture coordinate is calculated with 2's complement arithmetic, so there is no swapping involved. Finally, the PreSetup Event Task calls the Setup Event by issuing the event registers, which are described below.

The divide module simply allows the TPU 104 offload the division into the hardware. At least six event registers are sent by the TPU 104 and received by the Setup Event Module 105 in hardware.

The Setup Event Module 105 calculates all of the gradients by performing the following divisions: Num Steps=Delta X (if domY=0) else Delta Y; Gradient=Delta Y/Num Steps (if domY=0) else Delta X/Num Steps; Grad Color=Delta Color/Num Steps; Grad S (or T)=Delta S (or T)/Num Steps After all of the gradients are calculated, they are transmitted back to the TPU 104 via task registers.

The setup_event task is software that executes in the TPU 104, and its main goal is to issue a line generation event. The first step is to retrieve the correct vertex data from the header registers. This is based upon the command bits as well as the swap bit. The command bits will decide if the line generation is for a line, triangle edge #1, triangle edge #2, or triangle edge #3. The swap bits simply decide which of the two selected vertices is used as the starting vertex. During this step, the edge flag is also set. The final step is to collect all of the gradient data from the previous event and issue it all back out to the draw event module 106. The draw module 106 is where the actual fragment generation takes place, and it is called from the TPU 104. The kill_packet task deallocates the packet's memory and makes it available for another incoming packet.

The output module 100 of the rasterizer 100 is responsible for combining the output fragments and pipeline commands into one output to the fragment processor 140.

Figure 7:
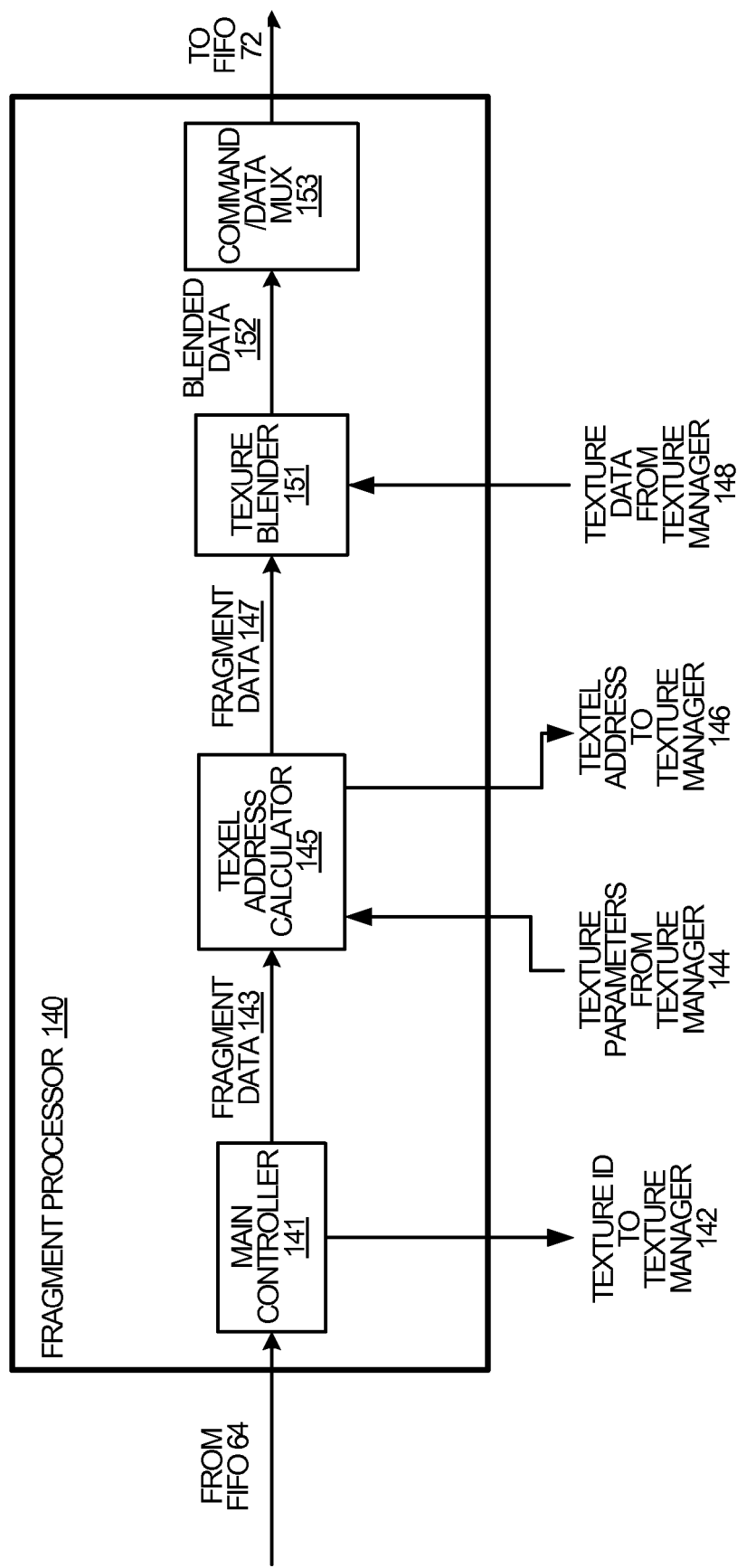
FIG. 7 is a block diagram of a fragment processor in the graphics processing unit implemented in a FPGA according to one example embodiment of the present invention.

FIG. 7 is a block diagram of a fragment processor 140 in the graphics processing unit 60 implemented in a FPGA according to one example embodiment of the present invention.

The fragment processor 140 is responsible for manipulating the color data of each pixel in accordance with various texture mode commands. The pixel data and commands are both received from the rasterizer 100, and the output pixel data is sent on to the frame buffer operator 160. The most often used functionality in the fragment processor 140 is that of texture blending. A texture is a set of data in memory that can be thought of as a bitmap, although it is not always in this exact RGB format. The fragment processor 140 blends the color data from the texture with the pixel data to create a new pixel to output to the frame buffer operator 160.

Because the fragment processor 140 would benefit from a certain level of programmability that would allow shaders or other custom functionality, the initial approach for the fragment processor 140 used a soft-core processor. However, analysis quickly revealed that millions of fragments per second could not be effectively processed by a soft-core processor The fragment processor 140 consists of three major functional modules with a multiplexer at the end to handle the output to the frame buffer operator 160. The primary modules are the main controller 141, texel interface 145, and the color blending 151. The main controller 141 provides overall control for the fragment processor 140. The texel interface 145 generates the texel (texture element) addresses and sends them to the texture manager 220, herein defined in further detail with regard to FIG. 10. The color blending actually blends the fragment color data with the texel color data to produce the final fragment output.

The main controller 141 is responsible for controlling the overall operation of the fragment processor 140. The main controller 141 receives OpenGL pipeline commands from the rasterizer 100, via a FIFO 64 and maintains all OpenGL state variables. The main controller 141 uses a large state machine to synchronize the processing and to control the flow of data to and from the fragment processor 140.

TABLE 1

Fragment Processor commands

| Command | Data Word 1 | Data Word 2 | Data Word 3 |
|---|---|---|---|
| Enable/Disable | 2D Texture | | |
| Bind Texture | <Texture ID> | | |
| Texture Environment | Mode | Modulate, Replace, Add, Decal, or Blend | |
| | Color | <RGBA> | |
| Texture Parameter | Mag Filter | Nearest or Linear | |
| | Texture Wrap - S | Repeat or Edge Clamp | |
| | Texture Wrap - T | Repeat or Edge Clamp | |
| Fragment | <X & Y & Z> | <RGBA> | <S & T> |

The only command that initiates any operation in the fragment processor 140 is the fragment command. All other commands are only used to update the state variables that are stored by the main controller 141. When the fragment is received, the current state of all variables is used by the actual fragment operations. If the texture is in the disable state when a fragment is received, then the fragment data is passed on to the frame buffer operator 160 without any processing. When texture environment or parameter changes are received, the main controller 141 will stall any new fragments until the fragment processor 140 has output all fragments that are currently in process. This method of stalling the processing during a state change ensures that the strict ordering of data and commands is maintained as they fragments flow to the frame buffer operator 160.

The texel interface 145 determines the addresses of the texels required for blending operations. For each fragment, there can be either one or four texels required, depending on the magnification filter value. If the nearest magnification mode is selected, then only one texel is required for blending; however, if the magnification is set to the linear mode, four texels are required along with interpolation. The texel addresses are offset values from the base of the selected texture's memory address. The equations used for the texel offset calculations are shown in the equations below, assuming that S and T are in the range from 0 to 1.

Nearest Magnification:offset=[round($S$*texture_width)]+[round($T$*texture_height)]*texture_width Linear Magnification:offset1=[roundup($S$*texture_width)]+[roundup($T$*texture_height)]

texture_widthoffset2=[roundup($S$*texture_width)]+[rounddown($T$*texture_height)]* texture_widthoffset3=[rounddown($S$*texture_width)]+[roundup($T$*texture_height)]* texture_widthoffset4=[rounddown($S$*texture_width)]+[rounddown($T$*texture_height)]*texture_width If S and T are not in the range of [0, 1], then they must be shifted to that range according to the texture wrap parameters. If repeat mode is selected, then any S value outside of [0, 1] is shifted into that range by subtracting or adding a multiple of the texture width. A similar algorithm is followed for the T value by shifting with the texture height. If clamp mode is selected, then the actual S and T values are clamped to the [0, 1] range.

To implement the calculations required, at least a six-stage FPGA pipeline is needed. This architectural technique ensures that each calculation will be complete in six clock cycles but also allows multiple (up to six) calculations to be underway simultaneously.

In the first stage, the S and T values are multiplied by their respective dimensional limits (width or height) at the same time that an encoder determines the adjustment that is necessary when S or T is out of the [0, 1] range. The multipliers use the FPGA's DSP blocks to perform 14-bit multiplication without consuming logic elements. In the second stage, simple 27-bit subtraction translates the texel back into the width and height of the texture. In the third stage, parallel processes perform three different types of rounding. In the fourth stage, normalization prepares the data for the multiplication, which occurs in the fifth pipeline stage. This stage also uses the FPGA DSP blocks to perform 12-bit by 13-bit multiplication. The final stage of the pipeline performs a logical OR operation to add the multiplier's output with the normalized x-value of the offset.

The color blending 151 performs the color blending based upon the fragment data and texel data. To accommodate the texture linear magnification mode, there are two steps in the color blending process as shown in FIG. 7. The nearest magnification mode bypasses the first step and proceeds directly with the second step of actual color blending.

The first step blends the four texel colors together using a weighted average calculation to determine the interpolated texel color. This module uses a combination of seven multipliers and adders for each color component, with all four components being processed simultaneously to maximize throughput. The second step blends together the texel color and fragment color based upon the texture environment mode setting. Each setting requires a different equation, and each color component requires four multipliers and five adders.

TABLE 2

Texture blending modes

| Mode | RGB Blending | Alpha Blending |
|---|---|---|
| Modulate | $C_O = C_T * C_F$ | $A_O = A_T * A_F$ |
| Replace | $C_O = C_T$ | $A_O = A_T$ |
| Add | $C_O = C_F + C_T$ | $A_O = A_F * A_T$ |
| Decal | $C_O = C_F * (1 - A_T) + C_T * A_T$ | $A_O = A_F$ |
| Blend | $C_O = CF * (1 - C_T) + C_C * C_T$ | $A_O = A_F * A_T$ |

$C_O$ = color output,
$C_F$ = fragment color,
$C_T$ = texture color,
$A_O$ = alpha output,
$A_F$ = fragment alpha,
$A_T$ = texture alpha,
$C_C$ = environment color To optimize the timing performance, the blended color output for each environment mode is calculated all the time, and multiplexers determine which blended color to output from the fragment processor 140. Overall, the color blending 151 requires 44 multipliers and 48 adders to complete the texel interpolation and fragment blending. While the texture calculations are ongoing, the unneeded fragment data (XYZ position) is stored in a FIFO (not shown) that is positioned in parallel with the processing. When the final calculation is ready, the FIFO's data is read and combined with the calculated color for output from the fragment processor 140.

Figure 8A:
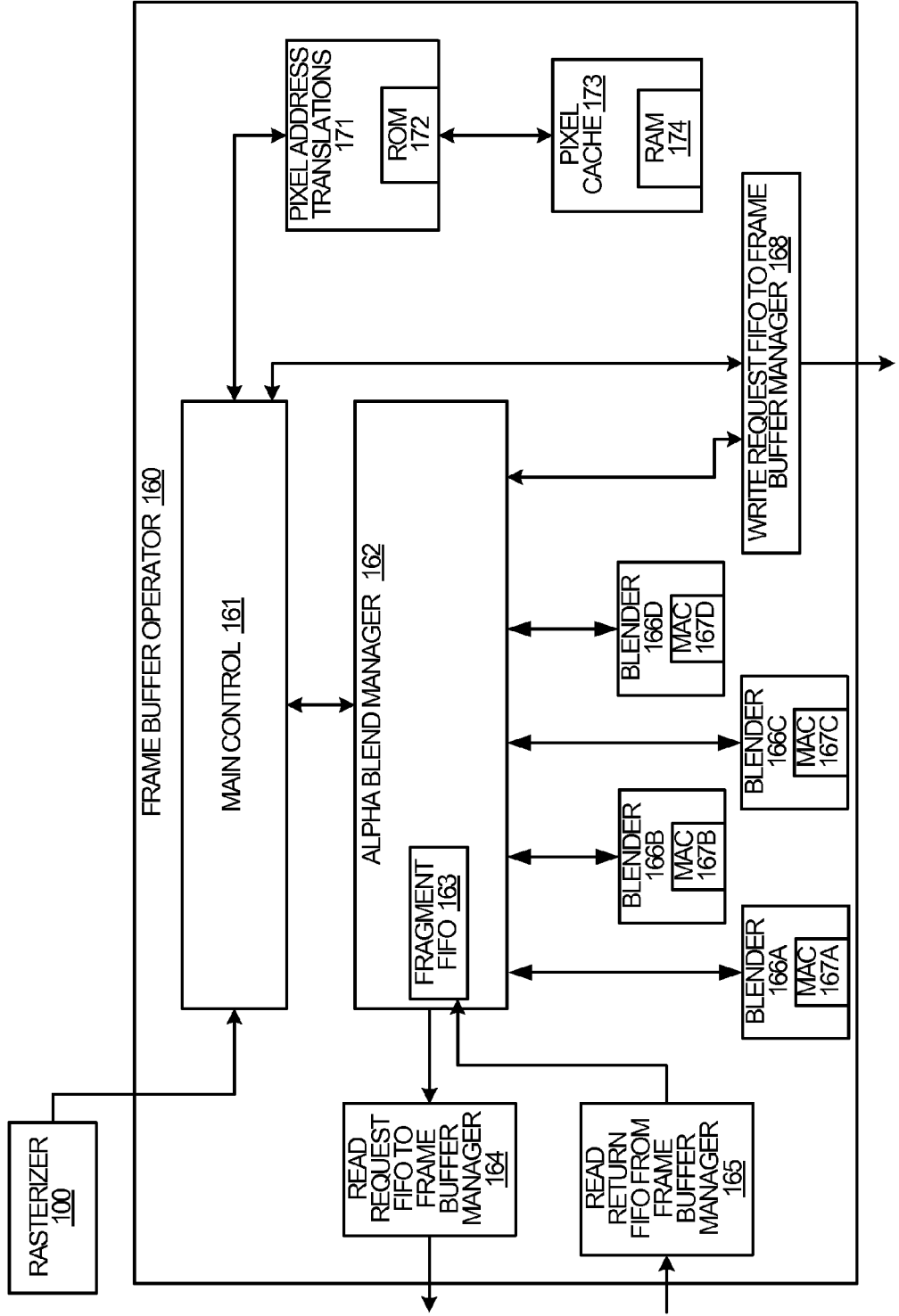
FIG. 8A is a block diagram of a frame buffer operator in the graphics processing unit implemented in a FPGA according to one example embodiment of the present invention.

FIG. 8A is a block diagram of a frame buffer operator 160 in graphics processing unit 60 implemented in a FPGA according to one example embodiment of the present invention.

Figure 8B:
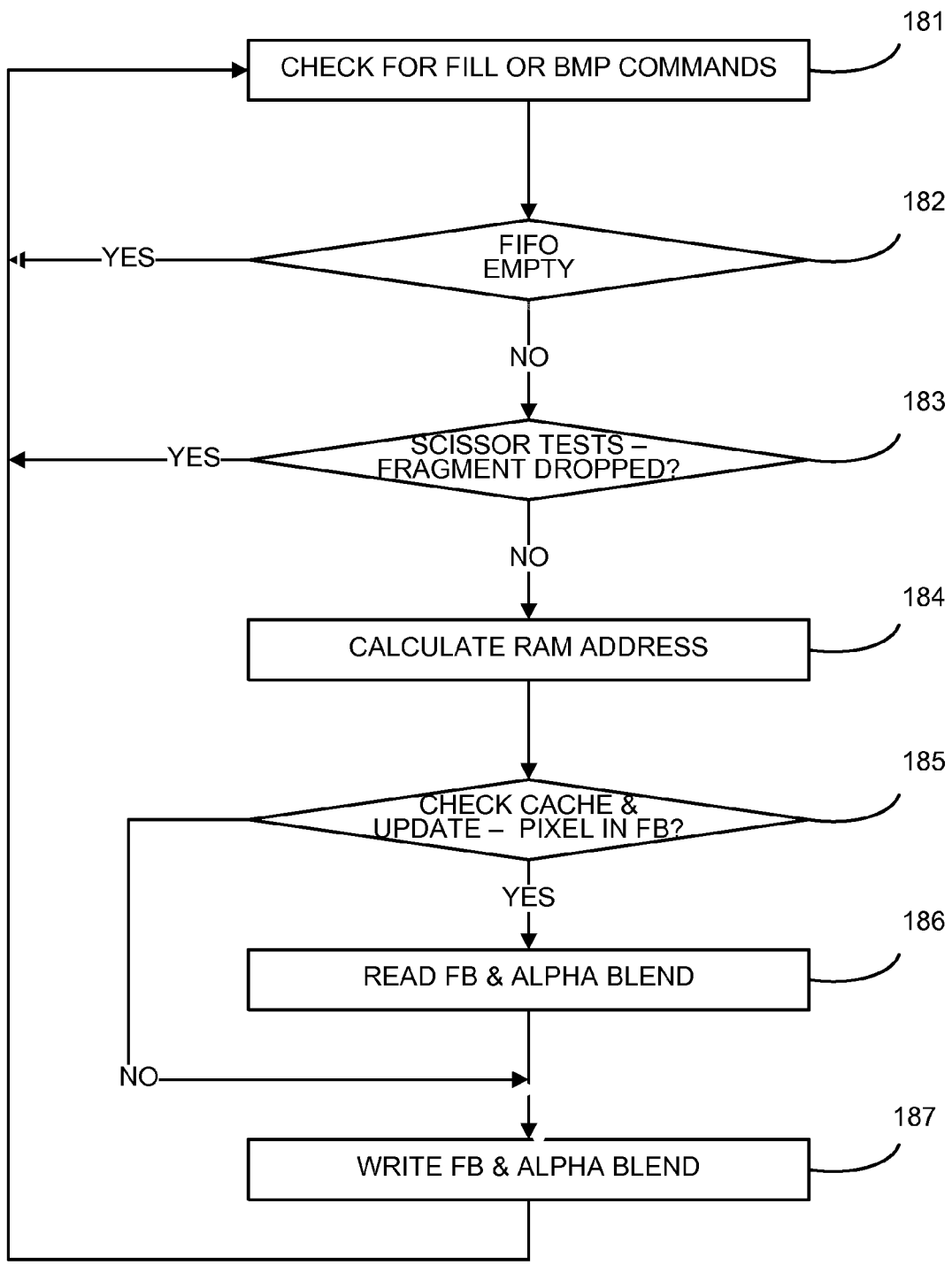
FIG. 8B is a block diagram of the operation of the frame buffer operator in the graphics processing unit implemented in a FPGA according to one example embodiment of the present invention.

The frame buffer operator 160 (FBO) receives fragments from the rasterizer 100 and performs final tests and alpha blending on the fragments before they are stored in the frame buffer memory 35. There are actually two frame buffers—a front buffer 164/165 and a back buffer 168. The displayed image comes from the front buffer 165 while the pipeline generates graphics in the back buffer 168. Once the entire front buffer 165 has been transmitted out, the buffers are swapped and the new back buffer 168 is cleared before more fragments are stored. The detailed operation of the architecture of the FBO is shown in FIG. 8B. The FBO 160 uses a state machine to sequence through the following tasks when a new fragment is received from the Rasterizer FIFO 64: scissor tests, pixel address translation, cache lookup, and possibly alpha blending.

The scissor test first eliminates any fragments that fall outside the user-defined scissor regions. The FBO 160 then uses a look-up table ROM 162 to accelerate the pixel address translation, which converts the fragment's x-y coordinates into a memory address. The basic equation for performing this translation is Address=($X$*horizontal size)+$Y$ The horizontal size depends upon the resolution, so this value is either 640, 800, or 1024, for VGA, SVGA, and XGA respectively. Thus, three separate look-up tables are used to perform these multiplications. The contents of the tables are preloaded such that the address for the LUT is used as the X value, and the output of the LUT will be the address multiplied by the horizontal screen size. As an alternative, this LUT-based approach to the translation could be replaced with an approach that uses the FPGA's multiplier blocks. The choice of using LUTs or multipliers depends upon the resources that are available in the specific FPGA device.

Once the memory address is known, a pixel cache 173 is used to determine if a fragment with the same address has already been generated in the current frame. This is a key contribution in the present invention because it potentially reduces the alpha blending latency from twenty clock cycles down to two clock cycles. The pixel cache 173 uses on-chip memory 174 that is 1-bit deep with 1024×768 locations (XGA resolution). A value of '1' in the cache location indicates that the corresponding pixel address in the frame buffer manager 224 has previously been written in the current frame. If the particular pixel location has never been written, then it is unnecessary to read from that location during alpha blending. The pixel cache 173 also has to be cleared every frame, whenever the frame buffer is cleared. The synchronized clearing ensures that the pixel validity in the cache is always correct.

This pixel cache contribution is very significant because memory bandwidth is a critical component that drives the performance of graphics processors. Table 2 shows that for various resolutions with graphics across 30% of the display, the memory access time for alpha blending can consume up to 98% of the frame period. When the pixel cache 173 is introduced, the memory accesses are only required for a much smaller portion of the frame. A typical display could have about 20% of the pixels overlapping, and this would result in a maximum of 19.7% of the frame period being used for alpha blending.

Alpha blending is the process of blending a new fragment with one that is already in the frame buffer. There are several different factors that can be used in the basic alpha blending equation, which is $C_O = SC_S + DC_D$. In this equation, S and D are the factors, $C_S$ is the new fragment color, and $C_D$ is the old fragment color in the frame buffer. $C_O$ is the color of the blended fragment that will be stored in the frame buffer manager 240. Regardless of the factors used, the FBO 160 needs the color of the existing fragment in the frame buffer to perform the blending. The inherent nature of memory introduces a significant latency to this read-modify-write transaction—unless the on-chip pixel cache 173 indicates that an existing fragment is not in the frame buffer at the same address.

There are actually four alpha blenders 166(A-D) because the memory controller has a maximum burst size of four reads, and an alpha blend manager 162 coordinates memory accesses to and from each alpha blender 166(A-D). When the alpha blend manager 162 issues a read request 164 to the frame buffer manager 240, it stores that fragment's data and address in a local fragment FIFO 164. When the frame buffer data returns to the alpha blend manager 162, the fragment's data is pulled from the local fragment FIFO 165 and given to the next available alpha blender 166(A-D).

Each alpha blender 166(A-D) performs the blending by using embedded DSP blocks for 8-bit×9-bit multiplication. Four DSP blocks are required in each blender 166—one each for the red, green, blue, and alpha components. The use of sixteen DSP blocks for this functionality is an example of how this architecture takes advantage of the FPGA's structures to maximize performance while not having to use any of the FPGA's logic elements. Furthermore, the design complexity and latency are much reduced from an implementation that uses either logic elements or memory to perform soft multiplication.

The detailed operation of the architecture of the FBO 160 is illustrated in FIG. 8B. First, the FPO 116 checks for a fill or BMP command at step 181. At step 182, FBO 160 checks to see if the fragment FIFO 163 is empty. If it is determined at step 182 that the fragment FIFO 163 is empty, then the FBO 160 returns to step 181. However, if it is determined at step 182 that the fragment FIFO 163 is not empty, then the FBO 160 then determines if the fragment has been dropped at step 183. If it is determined at step 183 that fragment has been dropped, then the FBO 160 returns to step 181. However, if it is determined at step 183 that a fragment has not been dropped, then the FBO 160 calculates the RAM address at step 184.

At step 185 the FBO 160 to see if the pixel cache 173 is updated and the pixel is in the frame buffer manager 240. If it is determined at step 185 that the pixel is not in the frame buffer manager 40, then the frame buffer operator 160 skips to step 187. However, it is determined in step 185 that the pixel is in the frame buffer manager 240, then the frame buffer operator 160 reads the frame data from the frame buffer manager 240 and performs alpha blending in step 186.

At step 187, the FBL 160 writes the pixel data to the frame buffer manager 240 and returns to step 181.

Figure 9:
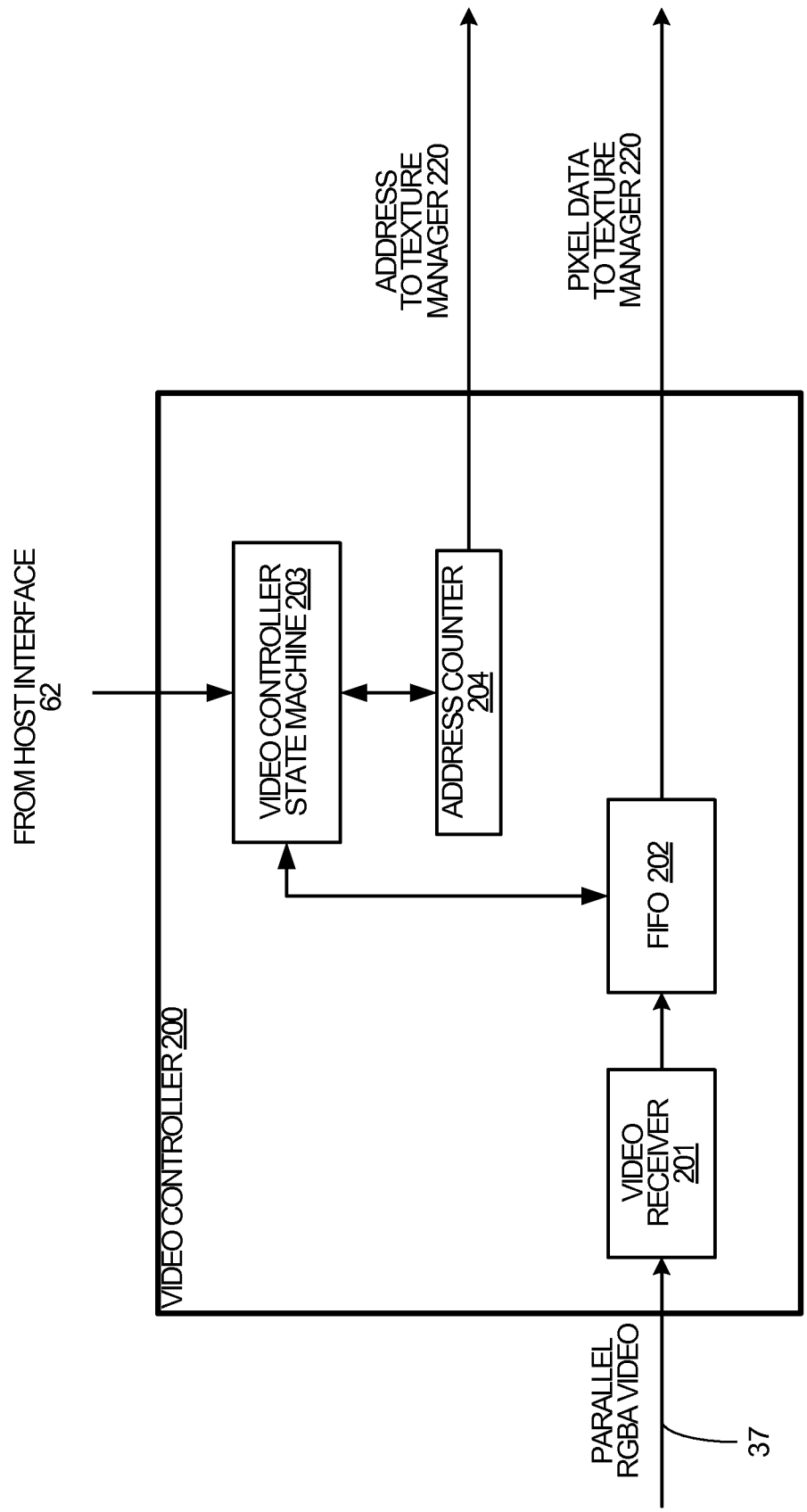
FIG. 9 is a block diagram of a video controller in the graphics processing unit implemented in a FPGA according to one example embodiment of the present invention.

FIG. 9 is a block diagram of a video controller 200 in the graphics processing unit 60 implemented in a FPGA according to one example embodiment of the present invention. The video controller 200 provides the ability to receive an external video source 37 and treat its data as a streaming texture. This enhanced feature is beyond the standard scope of OpenGL, but streaming texture functionality is very useful in many applications. Streaming textures are textures that are updated at a regular rate such as 30 Hz or 60 Hz. The texture can be a full-frame video from a camera source, or it could be as simple as a pattern or color which changes over time. The end result is that a portion of the rendered output appears to have live video or dynamic data embedded within it.

The video controller 200 is responsible for receiving external video data 37 and transferring it to the texture memory buffer. However, this simple operation requires careful attention due to the dynamic clock boundaries that result from the variable frequency of the input pixel clock. The solution to this possible timing issue is the creation of a very shallow FIFO buffer whose data can be clocked in with the pixel clock and clocked out with the internal GP clock. The format for the FIFO is shown below in the table below.

TABLE 3

| Video Input FIFO format | | | |
|---|---|---|---|
| VSYNC | HSYNC | Valid Data Flag | Pixel Data |
| 1 bit | 1 bit | 1 bit | 32 bit |
| 34 | 33 | 32 | 31 0 |

The video receiver module 201 continually writes data into the FIFO 202 at the rising edge of each pixel clock. The data valid bit is set when the external data enable signal is set. In the internal GP clock domain, the video controller state machine 203 continually reads data out of the FIFO 202. When the data valid bit is set, the pixel data is sent to the texture manager 220 along with an address. The address is generated through a counter that increments each time a valid data word is pulled from the FIFO 202. Thus, sequential addresses are written into the texture memory as the external video is decoded.

Figure 10:
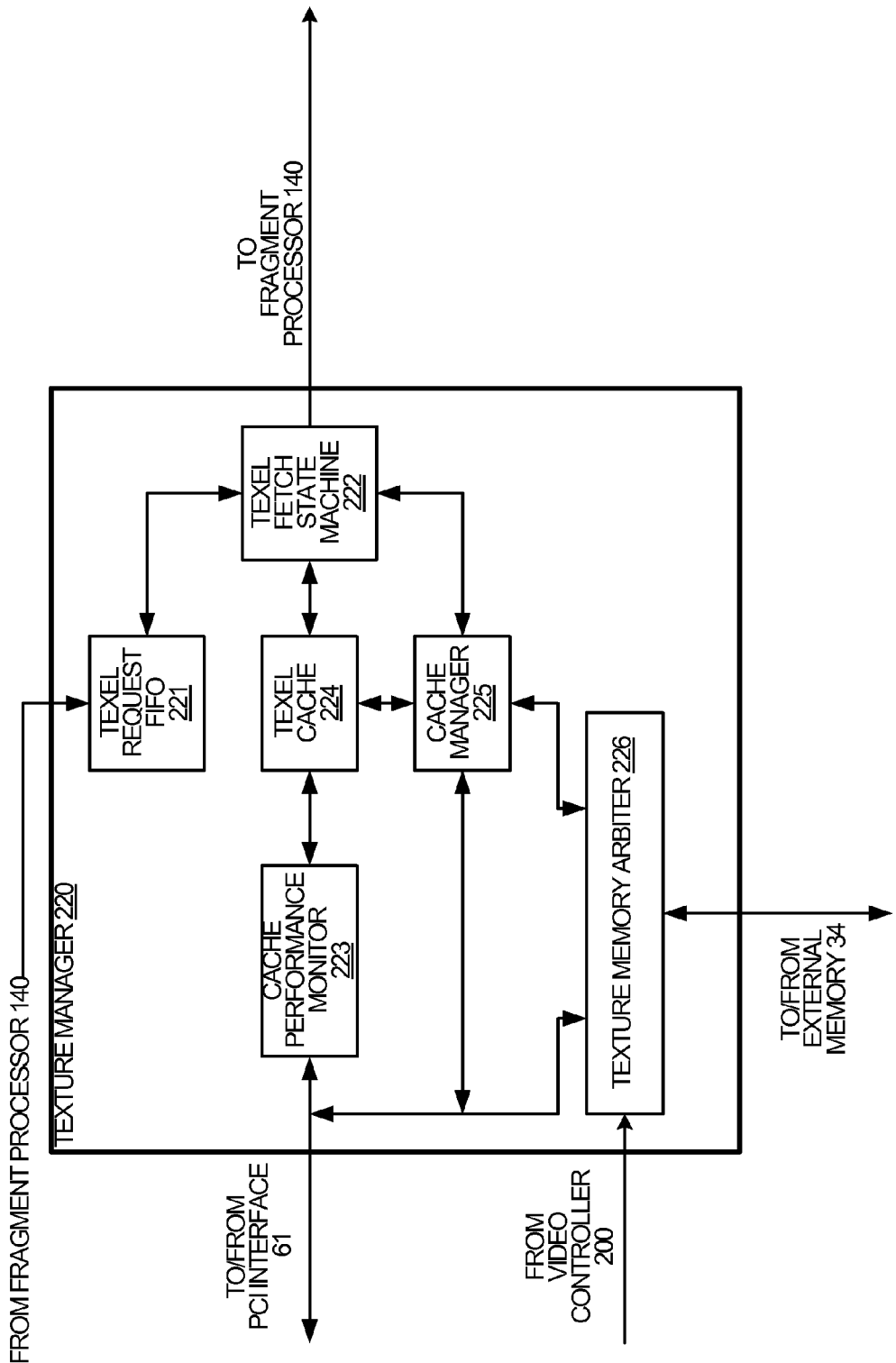
FIG. 10 is a block diagram of a texture manager in the graphics processing unit implemented in a FPGA according to one example embodiment of the present invention.

FIG. 10 is a block diagram of a texture manager 220 in the graphics processing unit 60 implemented in a FPGA according to one example embodiment of the present invention. The texture manager 220 coordinates the interfaces between the texture memory arbiter 226, the fragment processor 140, the video controller 200, and the PCI express port 61. Its primary focus is reducing the amount of time that the fragment processor 140 is stalled while waiting for texture data from the external texture memory. The video controller 200 and the PCI express port 61 both provide data into the texture memory arbiter 226, and the fragment processor 140 is typically the only interface reading data out of the texture memories. Texture data is available for reading by the PCI express port 61 as well, but this interface is not as impacted by latencies.

The texture manager 220 consists of four major modules and two storage elements. The texel fetch state machine 222 reads texel requests from the texel request FIFO 221 and retrieves the appropriate texel data from either the texel cache 224 (if it is available there) or the cache manager 225. The cache manager 225 coordinates texel data reads from texture memory arbiter 226 but also continuously fills the texel cache 224 during idle times on the texture memory interface. The texture memory arbiter 226 has three Avalon-MM interfaces as inputs and one Avalon-MM interface as an output to the external texture memory 34. The cache performance monitor 223 continuously reads texel cache 224 validities and maintains statistics on cache hits and misses.

The texel requests from the fragment processor 140 are first stored in the texel request FIFO 221 and then read out by the texel fetch state machine 222. Based upon the texel address, the texel fetch state machine 222 first looks to see if the texel cache 224 has valid data for that address. If so, the texel fetch state machine 222 reads the texel cache 224 and quickly sends the data back to the fragment processor 140. If the data is not available in the texel cache 224, then the texel fetch state machine 222 sends the texel address to the cache manager 225 for data retrieval. The texel fetch state machine 222 uses a very simple design that can provide texel data to the fragment processor 160 within three clock cycles if the data is available in the texel cache 224. If the data is not in the texel cache 224, then the latency is dependent upon the available bandwidth and latency of the texture memory 34.

The texel fetch state machine 222 is optimized by pipelining its operation into two stages. The first stage checks the texel cache 224 for the available data, and the second stage stalls while waiting on the data to return after the cache manager 225 has retrieved the data from external memory 34. The primary advantage to this approach is that if one texel request has stalled while awaiting data from external memory 34, the first pipeline stage can continue processing new texel requests as long as the data is available in the texel cache 224.

The cache manager 225 is responsible for maintaining the most useful texel data in the texel cache 224 as well as for fielding new data requests from the texel fetch state machine 222. The flexibility of an FPGA-based approach allows the use of different cache management techniques based upon the application's requirements. For applications that rely upon small textures to provide details in many different objects, the texel cache 224 is best managed as several small sub-caches. Each sub-cache would contain part or all of the data from each of the small textures. For applications that typically apply large textures to surfaces on the display, the texel cache 224 is best managed as one large cache that contains the data from multiple rows of the same texture. Keeping the texture's row data together is important because the rasterizer 100 outputs horizontal lines during its triangle fill operation.

The cache management approach is actually determined by the OpenGL driver or host application, and the selection is made through the PCIe interface 61 directly to the cache manager 225. As shown in Table 4, there are four cache management approaches available for selection, but the re-programmability of the FPGA allows the capability for more approaches should they be needed by certain applications. Each cache entry is 32-bits wide to accommodate one texel color. The texel addresses are not stored in the texel cache 224; instead, the texture's base address for each sub-cache is maintained in the cache manager 225 and used by the texel fetch state machine 222.

TABLE 4

Cache management approaches

| Number of Sub-Caches | Size of Sub-Caches (32-bit Texels) |
|---|---|
| 1 | 2048 |
| 2 | 1024 |
| 4 | 512 |
| 8 | 256 |

With the use of any cache, there must be a solid approach for maintaining the validity of the data in the cache. In this application, the cache data is invalidated when the texture data is updated either by the OpenGL driver or the video controller 200. To detect when a texel cache 224 may be invalid, a dedicated process runs continuously to check for a match in the texture base addresses between the cache textures and the texture being updated. When a match is found, the cache manager 225 flushes all the data from the texel cache 224 (or sub-cache) and slowly re-reads the texture data to repopulate the texel cache 224 for further use.

The cache performance monitor 223 is responsible for maintaining statistics on the texture cache 224 performance such that the OpenGL driver or host application can select the most efficient cache management approach. This feedback is also valuable for performance benchmarking as well as for architectural analysis. The number of texel cache 224 hits and misses are captured for each frame, and additional statistics could be implemented in the future to capture the number of used cache elements or the number of cache stalls.

The texture memory arbiter 226 regulates access to and from the external texture memory 34 to maximize pipeline performance. There are possibly up to three sources competing for memory bandwidth. The most important source is the texel fetch state machine 222 because it has the potential to throttle the performance of the entire GPU pipeline when it stalls. All of the interfaces into and out of the texture memory arbiter 226 can be standardized with to allow the use of well known Multi-Port Front End (MPFE) IP core.

The MPFE core is a weighted round-robin arbiter that supports up to sixteen ports that are trying to access one external memory 34 through another port. In one embodiment, the number of inputs (slave ports) is three, and the interface to the texel fetch state machine 222 was given 80% of the bandwidth to avoid pipeline stalls. In an actual application, the worst case latency at each port would need to be monitored to validate the bandwidth allocation.

Figure 11:
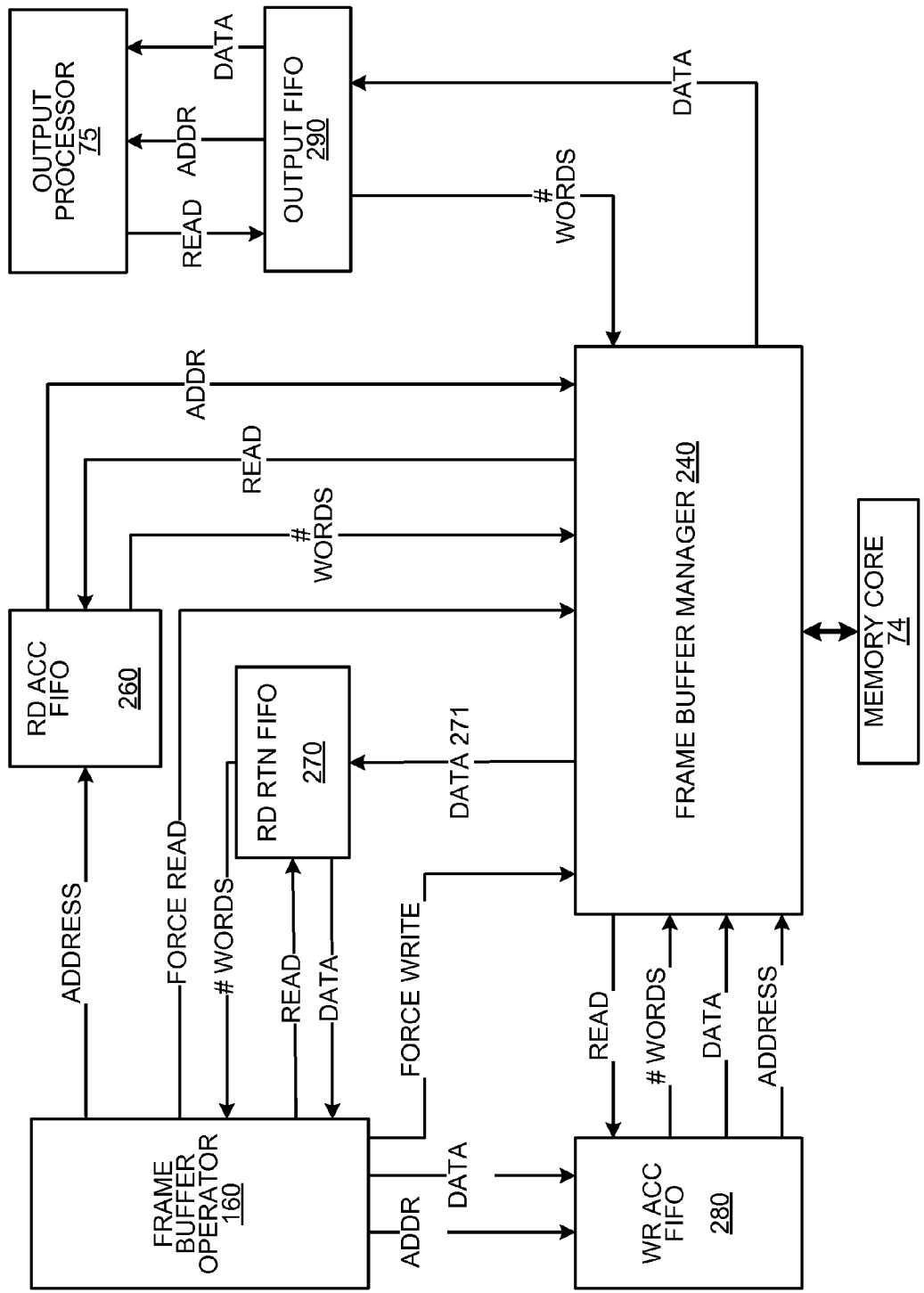
FIG. 11 is a block diagram of a frame buffer manager in the graphics processing unit implemented in a FPGA according to one example embodiment of the present invention.

FIG. 11 is a block diagram of the operation of a frame buffer manager 240 in the graphics processing unit 60 implemented in a FPGA according to one example embodiment of the present invention. As with other graphics processing architectures, the memory interface and arbitration in this architecture is a key contributor to high performance. In the illustrated example embodiment, single memory interface is used for both the front and back frame buffers, so the output processor 75, frame buffer operator 160, and PCI interface 61 must all share this one resource. The illustrated example memory interface uses a high-performance controller core which includes the memory's physical interface core. The core can operate up to 400 MHz but introduces a read latency of 21 clock cycles and a write latency of 13 clock cycles. To compensate for some of this latency, the transactions can be grouped together in bursts of four. The burst capability allows four read transactions within 25 clocks instead of 84 clocks.

The illustrated example memory architecture differs quite a bit from traditional GPU architectures because of the FPGA's relatively small on-chip memory and limited clock frequencies. The FPGA's memory architecture, on the other hand, must be crafted based upon the limitations imposed by the FPGA's capabilities. As a result, several arbitration methodologies were developed and analyzed before the preferred embodiment was determined.

From a very high level, there are two ways to approach the issue of memory arbitration—using a known fabric or designing a custom arbiter. One well-known system interconnect fabric (SIF) is used to handle all of the low-level details of on-chip interfaces. The SIF is automatically generated in based upon how the master ports and slave ports are interconnected. Using this approach means that the design effort is much simpler, but it relinquishes all control and possibilities for performance optimizations. As an alternative, the memory arbitration could be custom designed in order to maintain control over the performance. When taking this more manual approach, two different arbitration schemes were investigated: credit-based or priority-based. A credit based scheme would assign a certain number of tokens to each interface so that the bandwidth was proportionately divided based upon relative importance. However, for this illustrated example, a priority-based algorithm was used to maximize performance by ensuring that the graphics pipeline was not stalled as a result of memory bandwidth conflicts.

In order to hide the latencies caused by the external memory interface, the proposed architecture uses several relatively shallow FIFOs. FIG. 11 depicts the three FIFOs 260, 270 and 280 used between the FBO and the frame buffer manager to hide this memory latency.

The read access FIFO 260 stores memory addresses for FBO 160 read transactions, and the read return FIFO 270 stores the resulting data from the frame buffer manager 240. The write access FIFO 280 collects writes from the FBO 160 until the frame buffer manager 240 can execute the write transactions. These three FIFOs 260, 270 and 280 provide buffering that allows the FBO 160 to continue operating with minimal impact from the controller's memory latency.

On the output side, another output FIFO 290 buffers the data between the frame buffer manager 240 and the output processor 75. In normal operation, the frame buffer manager 240 fills the output FIFO 290 whenever it drops below half full. However, if the FBO 160 needs access to the memory 74 as well, there is a potential for conflict. The priority-based memory arbitration scheme allows maximum bandwidth for the FBO 160 while still allowing the output processor 75 to retrieve each video frame. The highest priority is avoidance of starvation of output processor 75, which means that fewer than 200 pixels are remaining in the output FIFO 292. Next on the priority list are writes and reads from the FBO 160 and then a standard read transaction to fill up the output FIFO 290. The burst capability of the memory interface allows the output FIFO 290 to recover very quickly (at 32 pixels every 25 clocks) from a starvation so that the FBO 160 can regain access to the memory 74. The lowest priority in the arbitration scheme is the PCI interface 61 since it should only be used during diagnostic activities. Most of the traffic from the PCI interface 61 should be entering the graphics pipeline instead of pixels being drawn directly in the frame buffer manager 240.

In addition to arbitrating between the FBO 160 and the output processor 75, the frame buffer manager 240 also converts the 64-bit data path into the individual 32-bit pixel data values. Because the memory controller is operating in half-rate mode (150 MHz), the data width is doubled twice—once for the half-rate mode and once for the double-data rate. Thus, the local data width is 256 bits, or eight pixels. The frame buffer manager 240 retrieves each block of eight pixels and stores them in the mixed-width output FIFO 290. The output side of the output FIFO 290 has a 32-bit width operating at the pixel clock frequency, which is based upon the display resolution and refresh rate. This mixed-width dual-clock FIFO is another example of how this architecture has been crafted specifically to take advantage of the FPGA's available structures.

Unlike the sequential memory addresses from the output processor 75, the FBO 160 typically provides a much more random pattern of pixel addresses to the frame buffer manager 240. To maximize the efficiency of the memory bandwidth, the frame buffer manager 240 compares the upper bits of the pixel addresses to collect as many write transactions as possible into the burst of four words (8 pixels each). The maximum number of pixels written in one burst is 32 pixels, and this maximum efficiency occurs when the pixels are written in order—such as during the operation that clears the frame buffer manager 240 at the beginning of each frame.

The output processor 75 is responsible for retrieving pixels from the front frame buffer manager 240 and transmitting them out according to the timing of the VESA specifications. The output processor 75 is parameterized to provide three different resolutions: VGA, SVGA, and XGA. Because of the different pixels clocks required for the different resolutions, the output processor 75 may be segregated into its own clock domain, with the actual clock frequency based upon the resolution. The output processor 75 uses a PLL with an input reference clock of 150 MHz, which is the base clock for the rest of the architecture. From this reference frequency, the PLL is parameterized to accept different register values that are used to generate the output clock frequency. The PLL is reconfigured by shifting in new settings via the PLL's serial shift-register chain.

The use of a reconfigurable PLL is another example of how this GPU architecture was crafted specifically for an FPGA to take advantage of its available resources. Modern FPGAs often have between one and four PLLs designed into the die as dedicated silicon. Each PLL consists of a phase-frequency detector, charge pump, voltage-controlled oscillator, and multiple counters.

FIG. 12 is a flow diagram of an exemplary design flow used for example, in semiconductor IC logic design, simulation, test, layout, and manufacture. Design flow 300 includes processes, machines and/or mechanisms for processing design structures or devices to generate logically or otherwise functionally equivalent representations of the design structures and/or devices described above and shown in FIGS. 2-11. The design structures (not shown) processed and/or generated by design flow 300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines (not shown) include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 300 may vary depending on the type of representation being designed. For example, a design flow for building a field programmable gate array (FPGA) may differ from a design flow for designing a standard component or from a design flow for instantiating the design into a programmable array, for example a programmable gate array (PGA) or an application specific IC (ASIC).

Multiple such design structures including a requirements definition that is preferably processed by a design process using requirements definitions. The requirements definitions may be a logical simulation design structure generated and processed by design process to produce a logically equivalent functional representation of a hardware device. Design structure may also or alternatively comprise data and/or program instructions that when processed by design process, generate a functional representation of the physical structure of a hardware device. Whether representing functional and/or structural design features, design structure may be generated using electronic computer-aided design (ECAD) such as implemented by a core developer/designer. When encoded on a machine-readable data transmission, gate array, or storage medium, requirements definition may be accessed and processed by one or more hardware and/or software modules within design process to simulate or otherwise functionally represent an electronic component, circuit, electronic or logic module, apparatus, device, or system such as those shown in FIGS. 2-12. As such, design structure may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process preferably employs and incorporates hardware and/or software modules for synthesizing, translating, or otherwise processing a design/simulation functional equivalent of the components, circuits, devices, or logic structures shown in FIGS. 2-11 to generate a netlist (not shown) which may contain design structures such as design structure. A netlist may comprise, for example, compiled or otherwise processed data structures representing a list of wires, discrete components, logic gates, control circuits, I/O devices, models, etc. that describes the connections to other elements and circuits in an integrated circuit design. The netlist may be synthesized using an iterative process in which netlist is resynthesized one or more times depending on design specifications and parameters for the device. As with other design structure types described herein, netlist may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 300 may include hardware and software modules for processing a variety of input data structure types including netlist. Such data structure types may reside, for example, within library elements and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications, characterization data, verification data, design rules, and test data files which may include input test patterns, output test results, and other testing information. Design process may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process without deviating from the scope and spirit of the invention. Design process may also include modules for performing standard circuit design processes such as timing analysis, verification, design rule checking, place and route operations, etc.

Design process 300 employs and incorporates logic and physical design tools (not shown) such as HDL compilers and simulation model build tools to process design structure together with some or all of the depicted supporting data structures along with any additional mechanical design or data (if applicable), to generate a second design structure. Design structure resides on a storage medium or programmable gate array in a data format used for the exchange of data of mechanical devices and structures (e.g. information stored in an ICES, DXF, Parasolid XT, JT, DRG, or any other suitable format for storing or rendering such mechanical design structures). Similar to design structure, design structure preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-11. In one embodiment, design structure may comprise a compiled, executable HDL simulation model that functionally simulates the devices shown in FIGS. 2-11.

Design structure may also employ a data format used for the exchange of layout data of integrated circuits and/or symbolic data format (e.g. information stored in a GDSII (GDS2), GL1, OASIS, map files, or any other suitable format for storing such design data structures)(not shown). Design structure may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-11. Design structure may then proceed to a stage where, for example, design structure: proceeds to tape-out, is released to manufacturing, is released to a mask house, is sent to another design house, is sent back to the customer, etc.

The design process 300 for the FPGA graphics processor design is first initialized at step 301. At step 302, the requirements definitions are generated. At step 303, the software algorithms are developed. At step 304, testing and simulation of the at PGA graphics processor is performed. At step 305, the firmware defining the FPGA graphics processor is optimized. At step 306, the firmware defining the FPGA graphics processor is tested with the simulator and development kit software. At step 307, it is determined if the current designed to FPGA graphics processor meets acceptable performance standards. If it is determined at step 307 that the FPGA graphics processor has not met the acceptable performance standards, then the design process 300 returns to repeat steps 305-307 to optimize the firmware description of the FPGA graphics processor. However, if it is determined at step 307 that the current firmware definition of the FPGA graphics processor meets acceptable performance standards, then the FPGA graphics processor design is integrated into a custom circuit at step 308.

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. A rasterizer in a graphic processor device implemented on a field programmable gate array circuitry, comprising:
a preprocessor that receives commands and vertices and creates data packets to generate at least one line;
a main module that generates a stream of data fragments that become pixels, wherein the main module further comprises a multi-threading packet processing engine that determines a dominant axis having a larger change in value in the line and sequences the vertices so that vertex coordinates increase along the dominant axis; and
a postprocessor that combines the data fragments and pipeline commands into one output to a fragment processor.

2. The rasterizer of claim 1, wherein the multi-threading packet processing engine further comprises:
an input event module that parses incoming data packets and prepares them for processing.

3. The rasterizer of claim 1, wherein the multi-threading packet processing engine further comprises:
a setup event module that calculates all gradients for the incoming data packets.

4. The rasterizer of claim 1, wherein the multi-threading packet processing engine further comprises:
a draw event module performs actual fragment generation for the incoming data packets.

5. The rasterizer of claim 1, wherein the multi-threading packet processing engine further comprises:
a thread packet processing unit (TPU).

6. The rasterizer of claim 5, wherein the TPU further comprises:
a PreSetup_Event process that executes in the TPU and decodes command bits to determine how to interpret vertex data.

7. The rasterizer of claim 5, wherein the TPU further comprises:
a Setup_Event process that executes in the TPU and determines if the line generation is for a line or triangle edge.

8. The rasterizer of claim 5, wherein the TPU further comprises:
a Kill_Packet process that deallocates the data packet's memory.

9. A hardware description language (HDL) design structure encoded on a non-transitory machine-readable data storage medium, the HDL design structure comprising elements that when executed in a computer-aided design system generate a machine-executable representation of a rasterizer in a graphic processor device implemented on a field programmable gate array circuitry, wherein the HDL design structure comprises:
a preprocessor module that, when executed, receives commands and vertices and creates data packets to generate at least one line;
a main module that, when executed, generates a stream of data fragments that become pixels, wherein the main module further comprises a multi-threading packet processing module that, when executed, determines a dominant axis having a larger change in value in the line and sequences the vertices so that vertex coordinates increase along the dominant axis; and
a postprocessor module that, when executed, combines the data fragments and pipeline commands into one output to a fragment processor.

10. The HDL design structure of claim 9, wherein the HDL design structure further comprises:
a plurality of buffer modules that, when executed, allow for storage while downstream modules are continuing to process previous data.

11. The HDL design structure of claim 9, wherein the multi-threading packet processing engine module further comprises:
an input event module that, when executed, parses incoming data packets and prepares them for processing;
a setup event module that, when executed, calculates all gradients for the incoming data packets; and
a draw event module that, when executed, performs actual fragment generation for the incoming data packets.

12. The HDL design structure of claim 9, wherein the multi-threading packet processing module further comprises:
a thread packet processing unit (TPU) module.

13. The HDL design structure of claim 9, wherein the TPU further comprises:
a PreSetup_Event process that, when executed, decodes command bits to determine how to interpret vertex data;
a Setup_Event process that, when executed, determines if the line generation is for a line or triangle edge; and
a Kill_Packet process that, when executed, deallocates the data packet's memory.

14. The HDL design structure of claim 9, wherein the HDL design structure comprises a netlist.

15. The HDL design structure of claim 9, wherein the HDL design structure resides in a field programmable gate array.

16. An improved rasterizer for use in a graphic processor device implemented on a field programmable gate array (FPGA) circuitry, the improvement therein comprising:
that the FPGA rasterizer includes a preprocessor that receives commands and vertices and creates data packets to generate at least one line;
the FPGA rasterizer further includes a main module that generates a stream of data fragments that become pixels, wherein the main module further comprises a multi-threading packet processing engine that determines a dominant axis having a larger change in value in the line and sequences the vertices so that vertex coordinates increase along the dominant axis; and
wherein the FPGA rasterizer further includes a postprocessor that combines the data fragments and pipeline commands into one output to a fragment processor.

* * * * *